(12) United States Patent
Tanaka

(10) Patent No.: US 11,657,743 B2
(45) Date of Patent: May 23, 2023

(54) DISPLAY DRIVER, ELECTRONIC APPARATUS, AND MOVING OBJECT

(71) Applicant: Seiko Epson Corporation, Tokyo (JP)

(72) Inventor: Kazuaki Tanaka, Nagano (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/509,134

(22) Filed: Oct. 25, 2021

(65) Prior Publication Data

US 2022/0130301 A1 Apr. 28, 2022

(30) Foreign Application Priority Data

Oct. 26, 2020 (JP) .............................. JP2020-178715

(51) Int. Cl.
*G09G 3/00* (2006.01)
*G09G 3/36* (2006.01)
*G09G 3/04* (2006.01)

(52) U.S. Cl.
CPC .............. *G09G 3/006* (2013.01); *G09G 3/04* (2013.01); *G09G 3/3611* (2013.01); *G09G 2310/0289* (2013.01); *G09G 2330/08* (2013.01); *G09G 2380/10* (2013.01)

(58) Field of Classification Search
CPC ........ G09G 3/006; G09G 3/04; G09G 3/3611; G09G 2310/0289; G09G 2330/08; G09G 2380/10; G09G 3/36; G09G 3/18; G09G 3/19; G09G 3/38; G06F 3/1423
See application file for complete search history.

(56) References Cited

U.S. PATENT DOCUMENTS

| | | | | |
|---|---|---|---|---|
| 4,692,760 A * | 9/1987 | Unno | ...................... | G06F 3/147 345/3.1 |
| 6,005,537 A | 12/1999 | Yokota et al. | | |
| 7,348,972 B2 * | 3/2008 | Ushigusa | ................. | G09G 3/04 345/204 |
| 2001/0035847 A1 | 11/2001 | Yokota et al. | | |
| 2004/0217927 A1 * | 11/2004 | Ushigusa | ................. | G09G 3/20 345/76 |
| 2006/0103607 A1 | 5/2006 | Park et al. | | |
| 2009/0115592 A1 * | 5/2009 | Miake | .................... | G09G 5/363 340/459 |
| 2009/0225107 A1 * | 9/2009 | Nose | .................... | G09G 3/3611 345/697 |

(Continued)

FOREIGN PATENT DOCUMENTS

| | | |
|---|---|---|
| CN | 1324553 C | 7/2007 |
| DE | 3639008 A1 | 5/1988 |

(Continued)

*Primary Examiner* — Mark W Regn
(74) *Attorney, Agent, or Firm* — Harness, Dickey & Pierce, P.L.C.

(57) ABSTRACT

A display driver includes a segment display portion drive circuit, a dot matrix display portion drive circuit, a segment data storage portion, a dot matrix data storage portion, and a control circuit, in which the dot matrix data storage portion stores data for second icon display, which is data for displaying a second icon that is a substitute for the first icon on the dot matrix display portion, and when the control circuit detects a display abnormality of the first icon, the control circuit transfers the data for second icon display from the dot matrix data storage portion to the dot matrix display portion drive circuit.

12 Claims, 14 Drawing Sheets

(56) References Cited

U.S. PATENT DOCUMENTS

| | | | |
|---|---|---|---|
| 2012/0038685 A1 | 2/2012 | Tanaka et al. | |
| 2013/0110348 A1 | 5/2013 | Jinbo et al. | |
| 2019/0179587 A1* | 6/2019 | Hsiung | G02B 27/0101 |
| 2020/0211491 A1 | 7/2020 | Muraki et al. | |
| 2020/0242989 A1 | 7/2020 | Ito | |
| 2020/0262294 A1* | 8/2020 | Gautier | B60K 35/00 |

FOREIGN PATENT DOCUMENTS

| | | | |
|---|---|---|---|
| JP | H05-289646 A | | 11/1993 |
| JP | H06-118942 A | | 4/1994 |
| JP | 2002-152866 A | | 5/2002 |
| JP | 2005-221664 A | | 8/2005 |
| JP | 2013-222175 A | | 10/2013 |
| JP | 2014-125006 A | | 7/2014 |
| JP | 2014125006 A | * | 7/2014 |
| JP | 2017-121841 A | | 7/2017 |
| JP | 2017121841 A | * | 7/2017 |
| JP | 2019-147535 A | | 9/2019 |
| JP | 2019147535 A | * | 9/2019 |
| WO | 2020065675 A1 | | 4/2020 |
| WO | WO-2020065675 | * | 4/2020 |

* cited by examiner

DISPLAY DRIVER, ELECTRONIC APPARATUS, AND MOVING OBJECT

The present application is based on, and claims priority from JP Application Serial Number 2020-178715, filed Oct. 26, 2020, the disclosure of which is hereby incorporated by reference herein in its entirety.

BACKGROUND

1. Technical Field

The present disclosure relates to a display driver, an electronic apparatus, and a moving object.

2. Related Art

In JP-A-2017-121841, a display device is described in which a plurality of displays are used in the display device and an image with high-level importance displayed on a display that has a display failure is displayed on a display that does not have a display failure and displays an image with low-level importance. Specifically, in the display device described in JP-A-2017-121841, a control device displays an inspection pattern image provided with a mark portion that is white or an intermediate color between white and black on each of the plurality of displays, at a predetermined timing, on a predetermined portion of the black background portion, and a sensor portion detects the mark portion displayed on each display. When any of the displays have a failure, an inspection pattern image is not displayed on the display with failure, so a detection signal of the mark portion is not output from the sensor portion. This non-detection state becomes a failure detection signal and is recognized by the control device, and an image with high-level importance is preferentially displayed on the display without any failure.

Further, JP-A-2002-152866 describes a remote control device that switches the display content of a display of a display in which both a segment display portion and a dot matrix display portion are disposed as needed. For example, in the remote control device described in JP-A-2002-152866, even when a display of the dot display portion is turned off to reduce power consumption, the details of the failure and details of the error are displayed on the dot display portion when a failure of an apparatus main body or a system error occurs, or a voltage of the battery that supplies power to a dot display drive portion and the dot display portion is monitored, and then a segment display portion displays that the dot display cannot be possible when it is determined that the dot display is possible due to the voltage drop.

However, in the display device described in JP-A-2017-121841, even when a display abnormality occurs in a part of the display, as long as the mark portion is normally displayed at a predetermined timing, it is not recognized as a failure, and an image with high-level importance is not preferentially displayed on another display. Further, in the remote control device described in JP-A-2002-152866, when a display abnormality occurs in an icon that is displayable on the segment display portion, there may be a possibility that appropriate information is not displayed. Therefore, in a display having a segment display portion and a dot matrix display portion, it is desired to continue displaying appropriate information even when a display abnormality occurs in the icon that is displayable on the segment display portion.

SUMMARY

One aspect of a display driver according to the present disclosure is a display driver for driving a display having a segment display portion and a dot matrix display portion, the display driver including a segment display portion drive circuit outputting a drive signal for segment display to the segment display portion, a dot matrix display portion drive circuit outputting a drive signal for dot matrix display to the dot matrix display portion, a segment data storage portion in which data of a display object including a first icon to be displayed on the segment display portion, is written, a dot matrix data storage portion in which display information data to be displayed on the dot matrix display portion is written, and a control circuit controlling the segment display portion drive circuit and the dot matrix display portion drive circuit, in which the dot matrix data storage portion stores data for second icon display, which is data for displaying a second icon that is a substitute for the first icon on the dot matrix display portion, and when the control circuit detects a display abnormality of the first icon, the control circuit transfers the data for second icon display from the dot matrix data storage portion to the dot matrix display portion drive circuit.

One aspect of an electronic apparatus according to the present disclosure includes the one aspect of the display driver and the display.

One aspect of a moving object according to the present disclosure includes the one aspect of the display driver and the display.

DESCRIPTION OF EXEMPLARY EMBODIMENTS

Hereinafter, a preferred embodiment of the present disclosure will be described in detail with reference to the accompanying drawings. The embodiment to be described below does not unduly limit the contents of the present disclosure described in aspects. In addition, all configurations to be described below are not limited to being essential constituent conditions of the present disclosure.

1. Display Driver

1-1. Configuration of Display Driver

Figure 1:
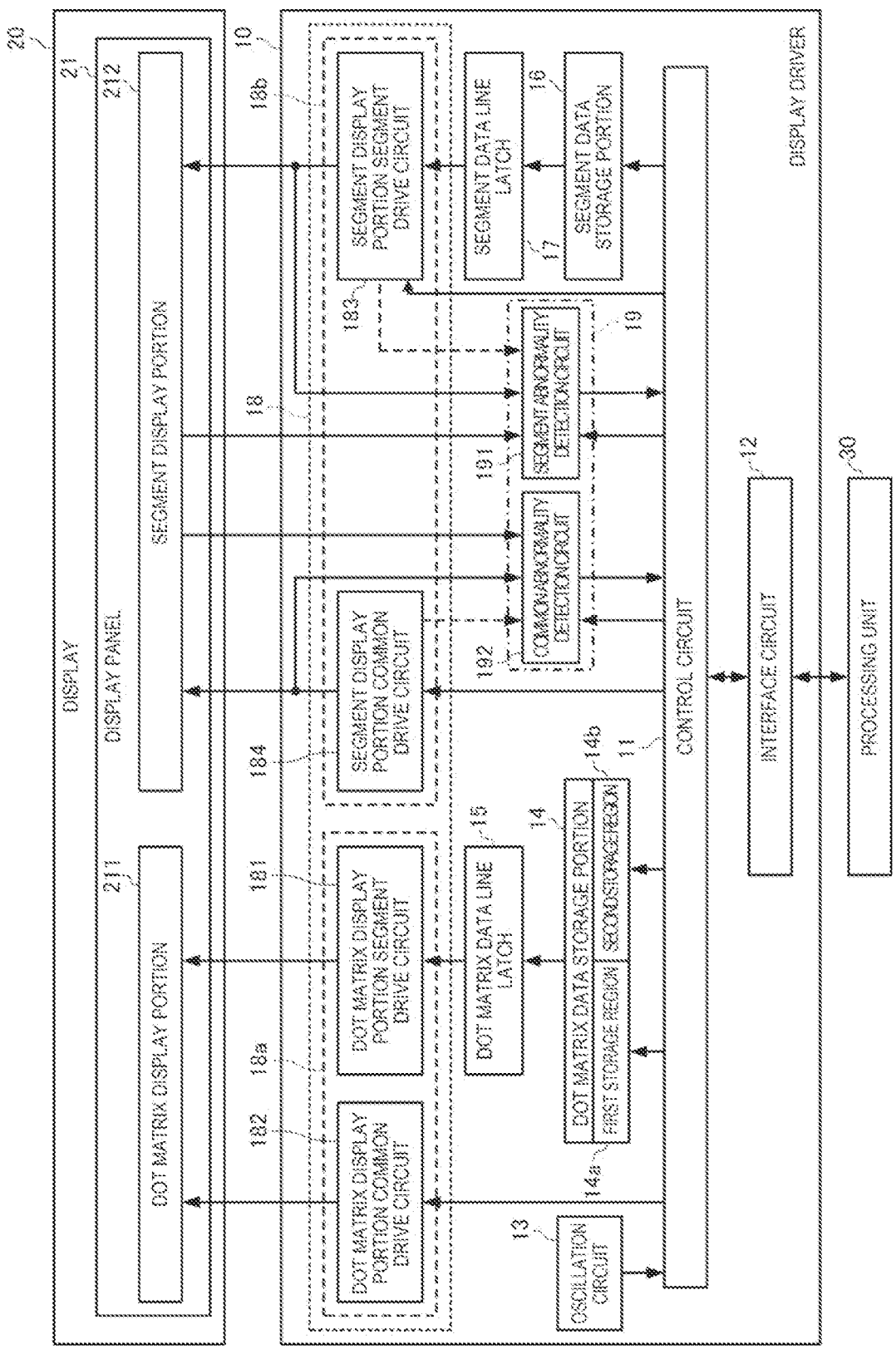
FIG. 1 is a diagram showing an example of a configuration of a display driver of the present embodiment.

FIG. 1 is a diagram showing an example of a configuration of a display driver of the present embodiment. As shown in FIG. 1, the display driver 10 of the present embodiment drives a display 20.

The display 20 includes a single display panel 21 provided with a dot matrix display portion 211 and a segment display portion 212. The dot matrix display portion 211 displays various information by using a plurality of dots arranged in a matrix form. The segment display portion 212 displays various display objects by supplying drive signals to a plurality of electrodes having predetermined respective shapes.

The display panel 21 is, for example, a liquid crystal panel, and includes two glass substrates and a liquid crystal enclosed therebetween. An electrode and a signal line are formed on each glass substrate by a transparent conductive film, and a display driver 10 that is COG mounted on one of the two glass substrates and an electrode are coupled by the signal line. COG is an abbreviation for Chip On Glass. The transparent conductive film is, for example, a thin film of ITO. ITO is an abbreviation for Indium Tin Oxide.

In the dot matrix display portion 211, one glass substrate is provided with a plurality of segment electrodes, and the other glass substrate is provided with a plurality of common electrodes. A segment drive signal for dot matrix display is supplied to each segment electrode, and a common drive signal for dot matrix display is supplied to each common electrode. For example, each segment electrode is an electrode with a linear form along a first direction, each common electrode is an electrode with a linear form along a second direction that is orthogonal to the first direction, and the intersection of each segment electrode and each common electrode becomes each dot in the dot matrix display.

Further, in the segment display portion 212, one glass substrate is provided with a plurality of segment electrodes, and the other glass substrate is provided with one or a plurality of common electrodes. A segment drive signal for segment display is supplied to each segment electrode, and a common drive signal for segment display is supplied to each common electrode. Each segment electrode is arranged so as to face either one or the plurality of common electrodes, and a region where the segment electrode and the common electrode are arranged so as to face each other becomes a display region of a display object indicated by the segment electrode.

The display panel 21 is not limited to the liquid crystal panel and may be, for example, an organic electro luminescence (EL) panel configured with a structured body with a layer form using an organic compound.

Figure 2:
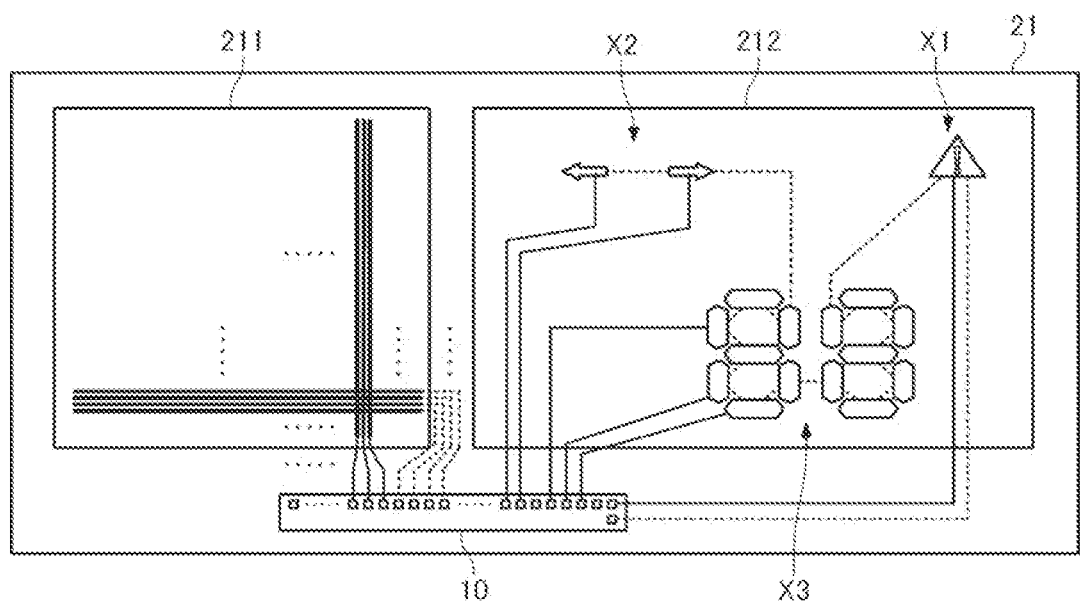
FIG. 2 is a diagram showing an example of a plurality of segment electrodes provided on a display panel.

FIG. 2 is a diagram showing an example of a plurality of segment electrodes provided on the display panel 21. In FIG. 2, a case in which the display driver 10, the display 20, and the processing unit 30 are mounted on a vehicle, a motorcycle, or the like is assumed.

In the example in FIG. 2, the dot matrix display portion 211 is provided with the plurality of segment electrodes with a linear form along the vertical direction and the plurality of common electrodes with a linear form along the horizontal direction, and the intersection of each segment electrode and each common electrode becomes each dot in the dot matrix display.

Further, the segment display portion 212 is provided with the plurality of segment electrodes each having a specific shape and one or the plurality of common electrodes, and three display objects X1, X2, and X3 can be displayed. In FIG. 2, the common electrode provided on the segment display portion 212 is not shown.

The display object X1 is a display object representing a warning light. The display object X1 represents, for example, a water temperature warning light, a hydraulic pressure warning light, an engine warning light, a fuel remaining amount warning light, or the like. The segment display portion 212 is provided with one segment electrode for displaying the display object X1.

The display object X2 is a display object representing a direction indicator. The segment display portion 212 is provided with one segment electrode for displaying a right pointing arrow of the display object X2 and one segment electrode for displaying a left pointing arrow of the display object X2.

The display object X3 is a display object representing a two-digit number. The display object X3 represents, for example, a numerical value measured by a speedometer, a tachometer, or the like. The segment display portion 212 is provided with seven segment electrodes for displaying the tens digit number of the display object X3 and seven segment electrodes for displaying the ones digit number of the display object X3. The display object X3 may be a block representing a level of the numerical value.

Each segment electrode provided on the segment display portion 212 and each segment electrode provided on the dot matrix display portion 211 are coupled to each terminal of the display driver 10 by a transparent wiring shown by a solid line, and a segment drive signal is applied via each wiring. The transparent wiring is, for example, ITO wiring. Further, the common electrode facing each segment electrode is coupled to each terminal of the display driver 10 by a transparent wiring shown by a broken line, and a common drive signal is applied via each wiring.

Figure 3:
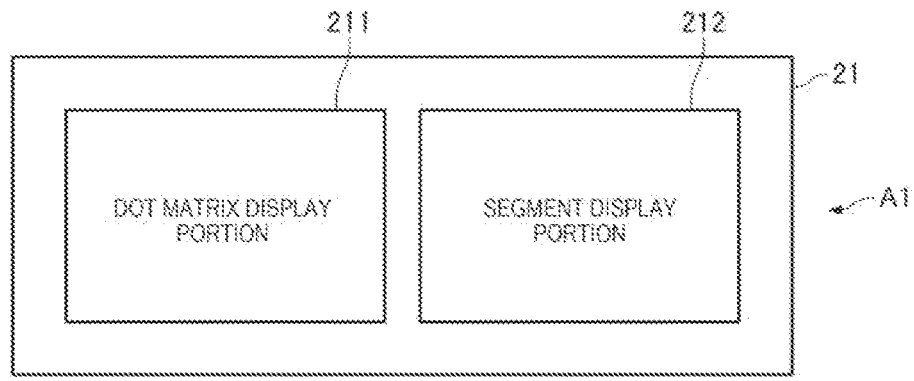
FIG. 3 is a diagram showing an example of an arrangement of a dot matrix display portion and a segment display portion.
Figure 3:
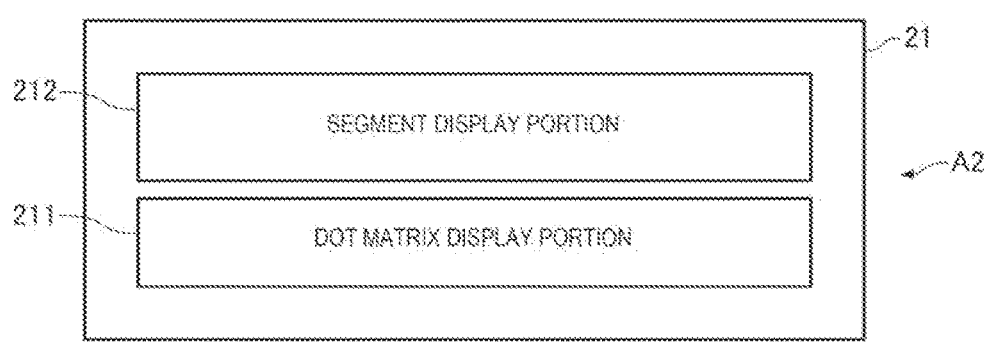
Figure 3:
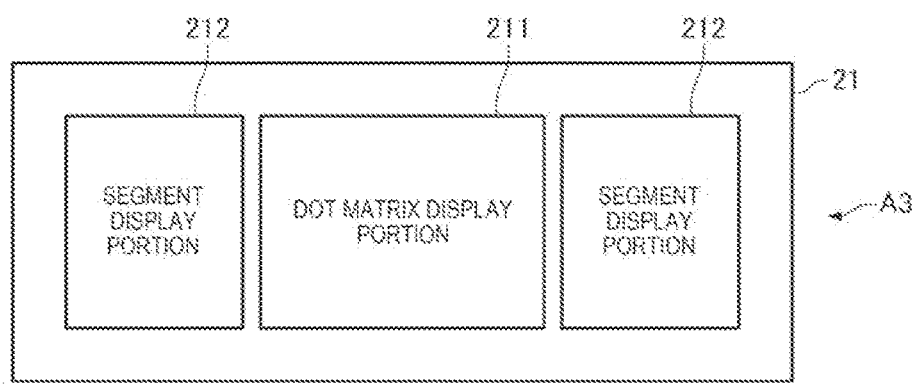
Figure 3:
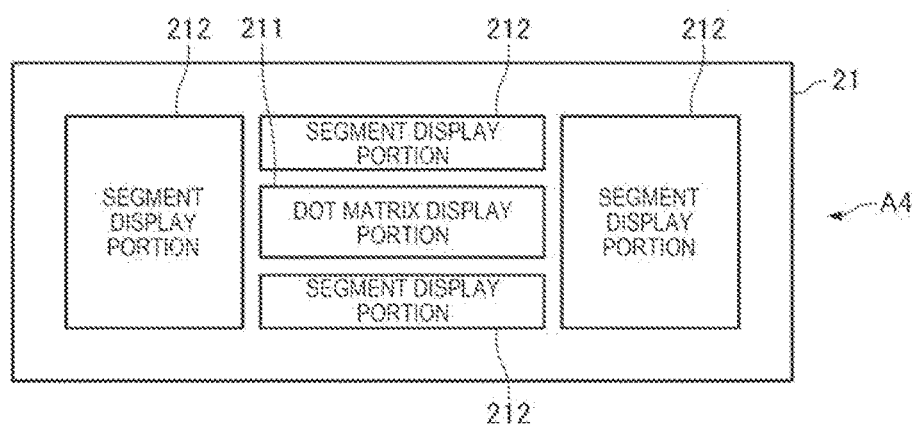

The disposition of the dot matrix display portion 211 and the segment display portion 212 in the display panel 21 is not particularly limited. For example, as shown in A1 in FIG. 3, the dot matrix display portion 211 and the segment display portion 212 may be disposed horizontally. Alternatively, as shown in A2 in FIG. 3, the dot matrix display portion 211 and the segment display portion 212 may be disposed vertically. Alternatively, as shown in A3 in FIG. 3, the dot matrix display portion 211 may be disposed in the center of the display panel 21, and the segment display portions 212 may be disposed separately on the left and right sides of the dot matrix display portion 211. Alternatively, as shown in A4 in FIG. 3, the dot matrix display portion 211 may be disposed in the center of the display panel 21, and the segment display portions 212 may be disposed separately on the top, bottom, left, and right sides of the dot matrix display portion 211.

Figure 4:
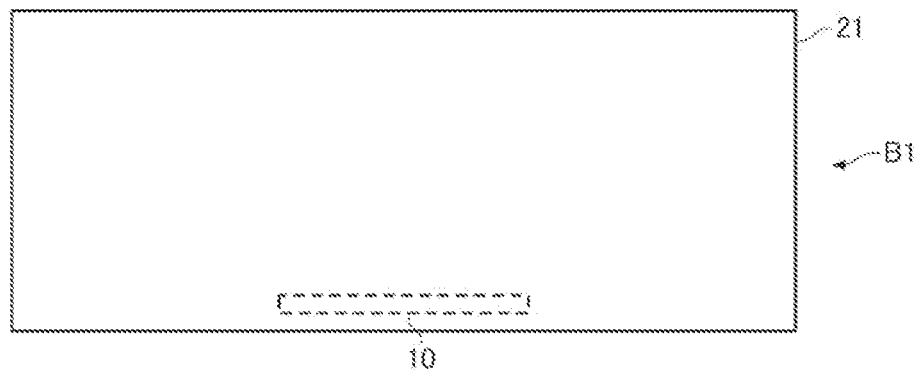
FIG. 4 is a diagram showing an example of an arrangement of a display driver.
Figure 4:
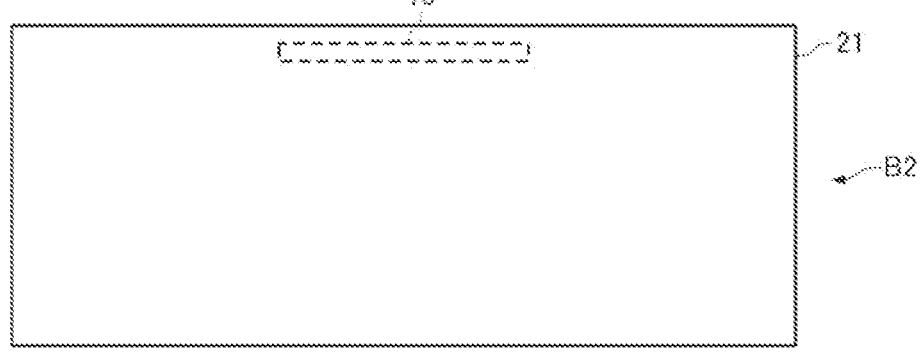
Figure 4:
Figure 4:

Further, the disposition of the display driver 10 is not particularly limited. For example, as shown in B1 in FIG. 4, the display driver 10 may be COG mounted at a lower portion of the display panel 21. Alternatively, as shown in B2 in FIG. 4, the display driver 10 may be COG mounted on an upper portion of the display panel 21. Alternatively, as shown in B3 in FIG. 4, the display driver 10 may be COG mounted on a left portion of the display panel 21. Alternatively, as shown in B4 in FIG. 4, the display driver 10 may be COG mounted on a right portion of the display panel 21.

Returning to the description of FIG. 1, the display driver 10 includes a control circuit 11, an interface circuit 12, an oscillation circuit 13, a dot matrix data storage portion 14, a dot matrix data line latch 15, a segment data storage portion 16, a segment data line latch 17, a display portion drive circuit 18, and a display abnormality detection circuit 19. In the present embodiment, the display driver 10 is an integrated circuit device, and the control circuit 11, the interface circuit 12, the oscillation circuit 13, the dot matrix data storage portion 14, the dot matrix data line latch 15, the segment data storage portion 16, the segment data line latch 17, the display portion drive circuit 18, and the display abnormality detection circuit 19 are included in the integrated circuit device.

The interface circuit 12 is a circuit for establishing data communication between the processing unit 30 provided outside the display driver 10 and the control circuit 11. The processing unit 30 is a processor such as a CPU, and functions as a host device or a controller with respect to the display driver 10.

The oscillation circuit 13 generates a clock signal for operating the control circuit 11. The oscillation circuit 13 may be, for example, a CR oscillation circuit.

In the dot matrix data storage portion 14, display information data to be displayed on the dot matrix display portion 211 is written.

In the segment data storage portion 16, data of a display object to be displayed on the segment display portion 212 is written.

The display portion drive circuit 18 outputs a drive signal for dot matrix display to the dot matrix display portion 211 and outputs a drive signal for segment display to the segment display portion 212. Specifically, the display portion drive circuit 18 includes a dot matrix display portion drive circuit 18a and a segment display portion drive circuit 18b. The dot matrix display portion drive circuit 18a outputs a drive signal for dot matrix display to the dot matrix display portion 211, and the segment display portion drive circuit 18b outputs a drive signal for segment display to the segment display portion 212.

The dot matrix display portion drive circuit 18a includes a dot matrix display portion segment drive circuit 181 and a dot matrix display portion common drive circuit 182. The dot matrix display portion segment drive circuit 181 outputs a segment drive signal for dot matrix display to each segment electrode of the dot matrix display portion 211. Further, the dot matrix display portion common drive circuit 182 outputs a common drive signal for dot matrix display to each common electrode of the dot matrix display portion 211. That is, the drive signal for dot matrix display output by the display portion drive circuit 18 includes each segment drive signal output from the dot matrix display portion segment drive circuit 181 and each common drive signal output from the dot matrix display portion common drive circuit 182.

The segment display portion drive circuit 18b includes a segment display portion segment drive circuit 183 and a segment display portion common drive circuit 184. The segment display portion segment drive circuit 183 outputs the segment drive signal for segment display to each segment electrode of the segment display portion 212. Further, the segment display portion common drive circuit 184 outputs the common drive signal for segment display to each common electrode of the segment display portion 212. That is, the drive signal for segment display output by the display portion drive circuit 18 includes each segment drive signal output from the segment display portion segment drive circuit 183 and each common drive signal output from the segment display portion common drive circuit 184.

The control circuit 11 controls the display portion drive circuit 18 based on a clock signal output from the oscillation circuit 13. Specifically, the control circuit 11 controls the dot matrix display portion drive circuit 18a and the segment display portion drive circuit 18b.

In the present embodiment, the control circuit 11 controls the dot matrix display portion drive circuit 18a as follows. First, the processing unit 30 transmits the display information data for one screen to be displayed on the dot matrix display portion 211 to the control circuit 11, and the control circuit 11 receives the display information data via the interface circuit 12. Next, the control circuit 11 writes the received display information data in the first storage region 14a of the dot matrix data storage portion 14. Next, the control circuit 11 sequentially designates each address of the first storage region 14a of the dot matrix data storage portion 14 and transfers each dot line data from the first storage region 14a of the dot matrix data storage portion 14 to the dot matrix data line latch 15. Thereafter, the dot matrix display portion segment drive circuit 181 of the dot matrix display portion drive circuit 18a generates and outputs each segment drive signal for dot matrix display based on the dot line data stored in the dot matrix data line latch 15. In this way, the control circuit 11 causes the dot matrix display portion 211 to output each segment drive signal for displaying the display information for one screen. Further, the control circuit 11 causes the dot matrix display portion common drive circuit 182 of the dot matrix display portion drive circuit 18a to synchronize with each segment drive signal and causes the dot matrix display portion 211 to output each common drive signal for displaying the display information for one screen. As a driving method of the dot matrix display portion 211, for example, the MLS method or the AP method is used. MLS is an abbreviation for Multi Line Selection and AP is an abbreviation for Alt Pleshko.

Further, the control circuit 11 controls the segment display portion drive circuit 18b as follows. First, the processing unit 30 transmits data of a display object for one screen to be displayed on the segment display portion 212 to the control circuit 11, and the control circuit 11 receives the data of the display object via the interface circuit 12. Next, the control circuit 11 writes the received data of the display object to the segment data storage portion 16. Next, the control circuit 11 sequentially designates each address of the segment data storage portion 16 and transfers each segment line data from the segment data storage portion 16 to the segment data line latch 17. Thereafter, the segment display portion segment drive circuit 183 of the segment display portion drive circuit 18*b* generates and outputs each segment drive signal for segment display based on the segment line data stored in the segment data line latch 17. In this way, the control circuit 11 causes the segment display portion 212 to output each segment drive signal for displaying the display object for one screen. Further, the control circuit 11 causes the segment display portion common drive circuit 184 of the segment display portion drive circuit 18*b* to synchronize with each segment drive signal and causes the segment display portion 212 to output each common drive signal for displaying the display information for one screen.

The dot matrix data storage portion 14 and the segment data storage portion 16 are configured with, for example, an SRAM. SRAM is an abbreviation for Static Random Access Memory. Further, the dot matrix data line latch 15 and the segment data line latch 17 are configured with, for example, a register.

The display abnormality detection circuit 19 detects a display abnormality of a predetermined icon including a first icon that is displayable on the segment display portion 212. The display abnormality of the icon is, for example, an abnormality in which the icon is not always displayed, an abnormality in which the icon is always displayed, or the like. One icon is displayed by one segment electrode provided on the segment display portion 212, and in the example in FIG. 2, the display object X1 is one icon, the display object X2 is configured with two icons, and the display object X3 is configured with 14 icons. The predetermined icon for which the display abnormality is detected by the display abnormality detection circuit 19 does not have to be all the icons that can be displayed on the segment display portion 212, and at least the first icon may be included. In the present embodiment, the first icon is an icon for warning display such as the display object X1 representing the warning light shown in FIG. 2.

The display abnormality detection circuit 19 includes a segment abnormality detection circuit 191 and a common abnormality detection circuit 192.

The segment abnormality detection circuit 191 detects an abnormality in the segment drive signal supplied to the segment electrode for displaying the predetermined icon including the first icon. Specifically, based on the expected value signal supplied from the control circuit 11, the segment abnormality detection circuit 191 detects the abnormality in the segment drive signal when the segment drive signal output from the segment display portion segment drive circuit 183 or the signal input from the segment electrode to the display driver 10 is not the expected voltage value. The expected value signal may be supplied from the segment display portion segment drive circuit 183 to the segment abnormality detection circuit 191.

The common abnormality detection circuit 192 detects an abnormality in the common drive signal supplied to the common electrode for displaying the predetermined icon including the first icon. Specifically, based on the expected value signal supplied from the control circuit 11, the common abnormality detection circuit 192 detects the abnormality in the common drive signal when the common drive signal output from the segment display portion common drive circuit 184 or the signal input from the common electrode to the display driver 10 is not the expected voltage value. The expected value signal may be supplied from the segment display portion common drive circuit 184 to the common abnormality detection circuit 192.

The display abnormality detection circuit 19 detects a display abnormality of the icon when the abnormality in the segment drive signal for displaying the icon is detected by the segment abnormality detection circuit 191 or the abnormality in the common drive signal for displaying the icon is detected by the common abnormality detection circuit 192. The display abnormality of the icon occurs, for example, due to a failure of the segment display portion segment drive circuit 183 or the segment display portion common drive circuit 184, disconnection or short circuit of a wiring that couples the segment electrode and the output terminal of the display driver 10 or a wiring that couples the common electrode and the output terminal of the display driver 10, or the like.

In the present embodiment, the dot matrix data storage portion 14 stores the data for second icon display, which is the data for displaying the second icon that is a substitute for the first icon, on the dot matrix display portion 211. Specifically, the dot matrix data storage portion 14 includes a first storage region 14*a* in which the display information data to be displayed on the dot matrix display portion 211 that is transmitted from the processing unit 30 is written, and a second storage region 14*b* in which data for displaying each icon that is a substitute for each of the predetermined icons including the first icon on the dot matrix display portion 211 is stored. That is, the data for second icon display is stored in the second storage region 14*b*.

In the present embodiment, when the power of the display driver 10 is turned on, the processing unit 30 transmits data of the information to be initially displayed on the dot matrix display portion 211 to the display driver 10, and in the display driver 10, the control circuit 11 writes the data in the first storage region 14*a* of the dot matrix data storage portion 14. Further, the processing unit 30 transmits the data for displaying each icon, which is a substitute for each of the predetermined icons on the dot matrix display portion 211, to the display driver 10, and in the display driver 10, the control circuit 11 writes the data in the second storage region 14*b* of the dot matrix data storage portion 14.

After that, the initial information is displayed on the dot matrix display portion 211. At this point, the second storage region 14*b* of the dot matrix data storage portion 14 stores the data of the icon which is a substitute for each icon that can be displayed on the segment display portion 212, including the data for second icon display.

When the control circuit 11 detects the display abnormality of any of the icons, the control circuit 11 transfers the data of the icon that is a substitute for the icon, in which the display abnormality is detected, from the second storage region 14*b* of the dot matrix data storage portion 14 to the dot matrix display portion drive circuit 18*a*. For example, when the control circuit 11 detects the display abnormality of the first icon, the control circuit 11 transfers the data for second icon display, from the second storage region 14*b* of the dot matrix data storage portion 14 to the dot matrix display portion drive circuit 18*a*. In a case in which the control circuit 11 detects the display abnormality of any of the icons, when the data for displaying the icon, in which the display abnormality is detected, on the segment display portion 212 is written in the segment data storage portion 16, the control circuit 11 may transfer the data of the icon that is a substitute for the icon, in which the display abnormality is detected, from the second storage region 14*b* of the dot matrix data storage portion 14 to the dot matrix display portion drive circuit 18*a*. For example, in a case in which the control circuit 11 detects the display abnormality of the first icon, when the data for first icon display, which is the data for displaying the first icon on the segment display portion 212, is written in the segment data storage portion 16, the control circuit 11 may transfer the data for second icon display, from the second storage region 14b of the dot matrix data storage portion 14 to the dot matrix display portion drive circuit 18a. In the present embodiment, the control circuit 11 detects the display abnormality of the first icon by the display abnormality detection circuit 19 detecting the display abnormality of the first icon. The dot matrix display portion segment drive circuit 181 outputs a segment drive signal corresponding to the data for second icon display to the dot matrix display portion 211. As a result, instead of displaying the first icon on the segment display portion 212, the second icon is displayed on the dot matrix display portion 211.

Further, when the control circuit 11 detects the display abnormality of any of the icons, that is, when the display abnormality of any of the icons is detected by the display abnormality detection circuit 19, the control circuit 11 controls the segment display portion drive circuit 18b such that the icon, in which the display abnormality is detected, is not displayed on the segment display portion 212. For example, when the control circuit 11 detects the display abnormality of the first icon, the control circuit 11 controls the segment display portion drive circuit 18b such that the first icon is not displayed on the segment display portion 212. As a result, the first icon is not displayed on the segment display portion 212.

Further, when the control circuit 11 detects the display abnormality of any of the icons, the control circuit 11 transmits a signal indicating the display abnormality of the icon to the outside of the display driver 10. Specifically, when the control circuit 11 detects the display abnormality of the icon, the control circuit 11 sets a flag indicating that the display abnormality of the icon is detected, in a register (not shown). Further, the control circuit 11 may transmit a signal indicating the display abnormality to the processing unit 30 via the interface circuit 12. By periodically or receiving a signal indicating the display abnormality, and sequentially reading the flag for each icon, the processing unit 30 can identify the icon in which the display abnormality is detected. For example, when the control circuit 11 detects the display abnormality of the first icon, the control circuit 11 transmits a signal indicating the display abnormality of the first icon to the outside of the display driver 10. When the control circuit 11 detects the display abnormality of the first icon, the control circuit 11 may spontaneously transmit the signal indicating the display abnormality of the first icon to the outside of the display driver 10 or transmit the signal such as a flag indicating the display abnormality of the first icon to the outside of the display driver 10 in response to a request from the outside of the display driver 10. By receiving the signal indicating the display abnormality of the first icon, the processing unit 30 can display the information different from the second icon, for example, the information related to the response that a user should take to the display of the second icon, or the like on the dot matrix display portion 211.

In the example of the configuration of the display driver 10 of the present embodiment shown in FIG. 1, immediately after the power of the display driver 10 is turned on, the data of the icon, which is a substitute for each icon, transmitted from the processing unit 30 is written to the second storage region 14b of the dot matrix data storage portion 14 but the data may be written in the second storage region 14b of the dot matrix data storage portion 14 by using any other method.

Figure 5:
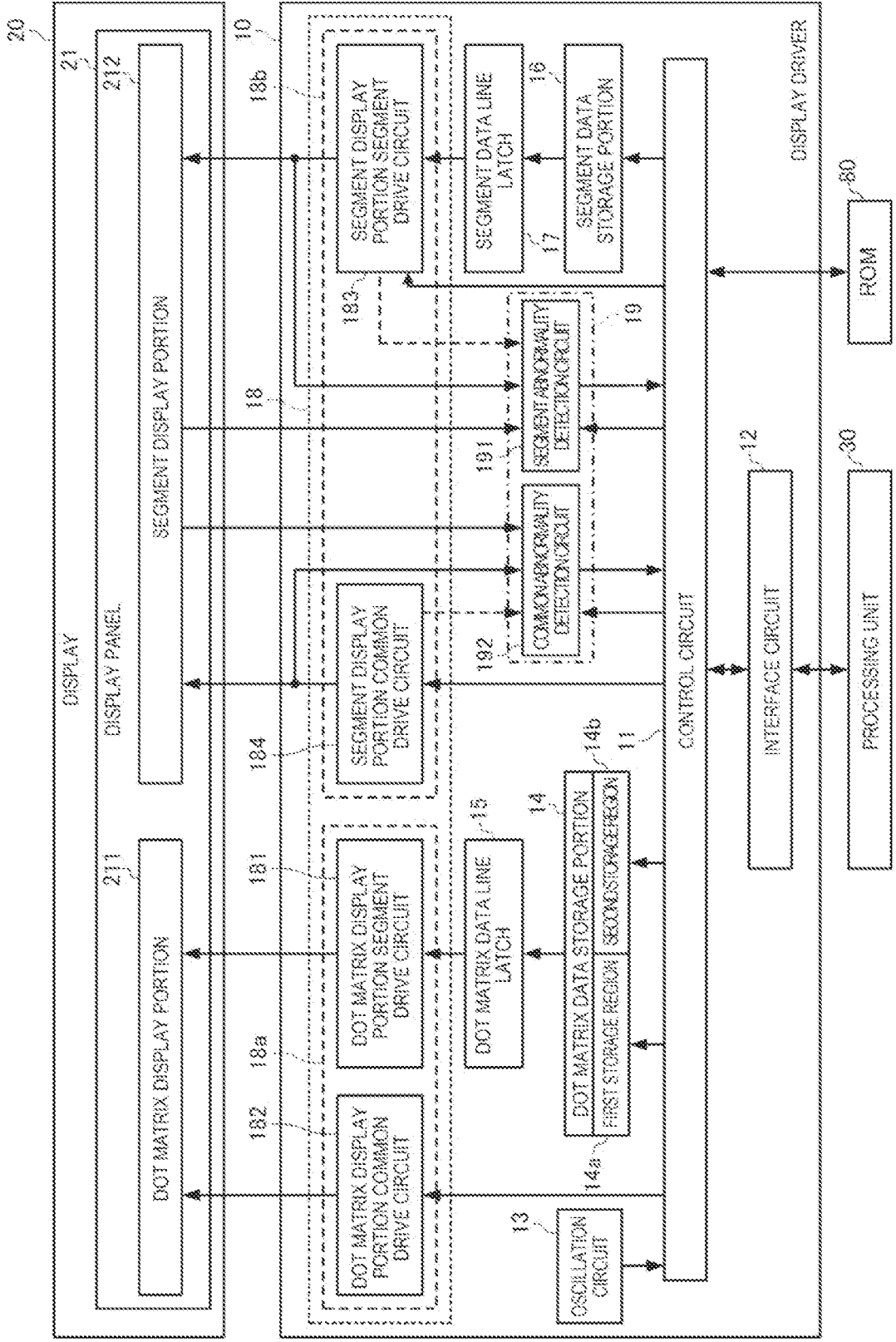
FIG. 5 is a diagram showing an example of another configuration of the display driver of the present embodiment.

For example, as shown in FIG. 5, the outside of the display driver 10 may be provided with a ROM 80 that stores the data of the icon, which is a substitute for each icon, and immediately after the power of the display driver 10 is turned on, the control circuit 11 may read the data from the ROM 80 and write the data in the second storage region 14b of the dot matrix data storage portion 14. ROM is an abbreviation for Read Only Memory.

Figure 6:
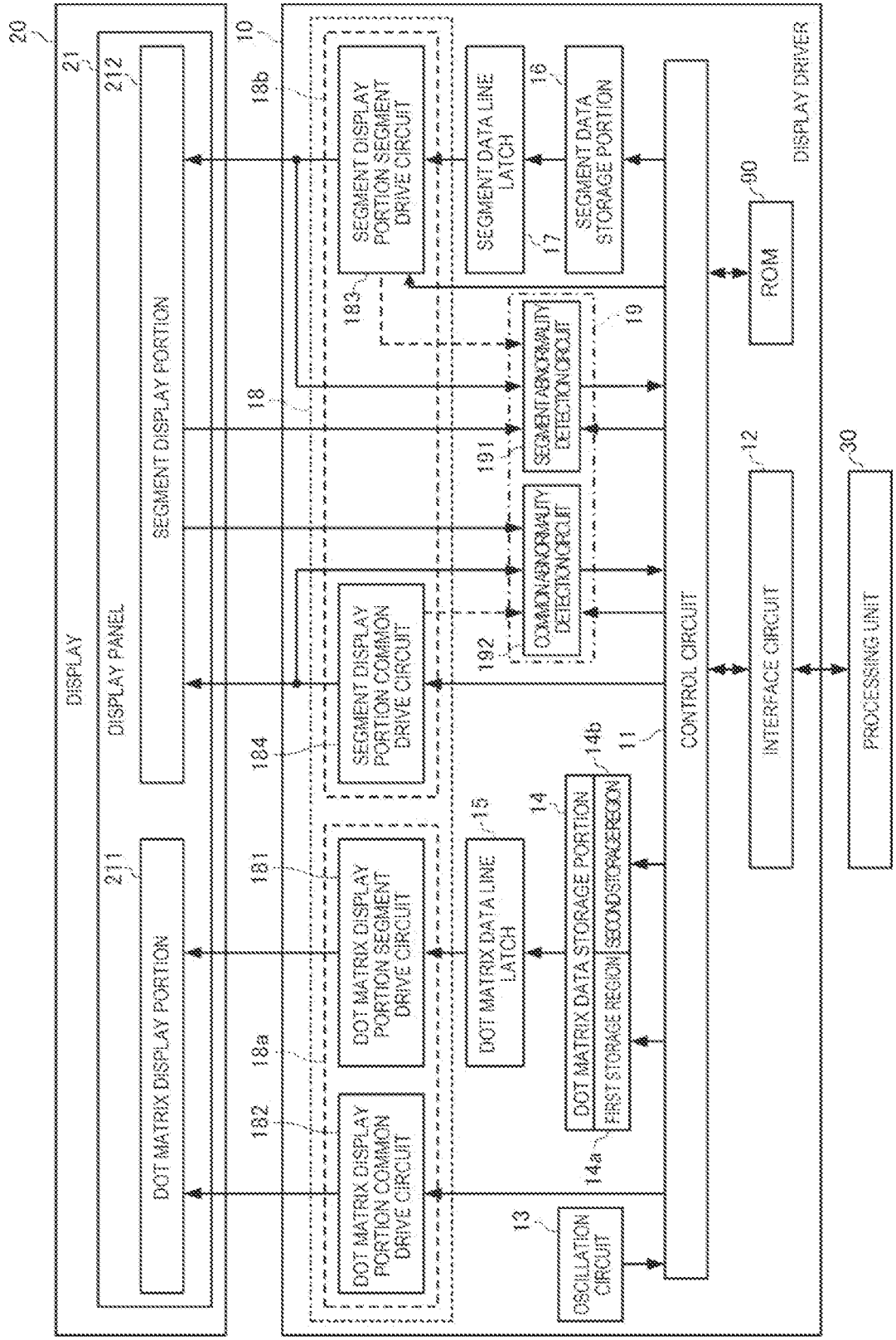
FIG. 6 is a diagram showing an example of still another configuration of the display driver of the present embodiment.

Further, for example, as shown in FIG. 6, the inside of the display driver 10 may be provided with a ROM 90 that stores the data of the icon, which is a substitute for each icon, and immediately after the power of the display driver 10 is turned on, the control circuit 11 may read the data from the ROM 90 and write the data in the second storage region 14b of the dot matrix data storage portion 14.

1-2. Configuration of Segment Display Portion Drive Circuit and Display Abnormality Detection Circuit FIGS. 7 and 8 are diagrams showing an example of a specific configuration of the segment display portion drive circuit 18b and the display abnormality detection circuit 19.

Figure 7:
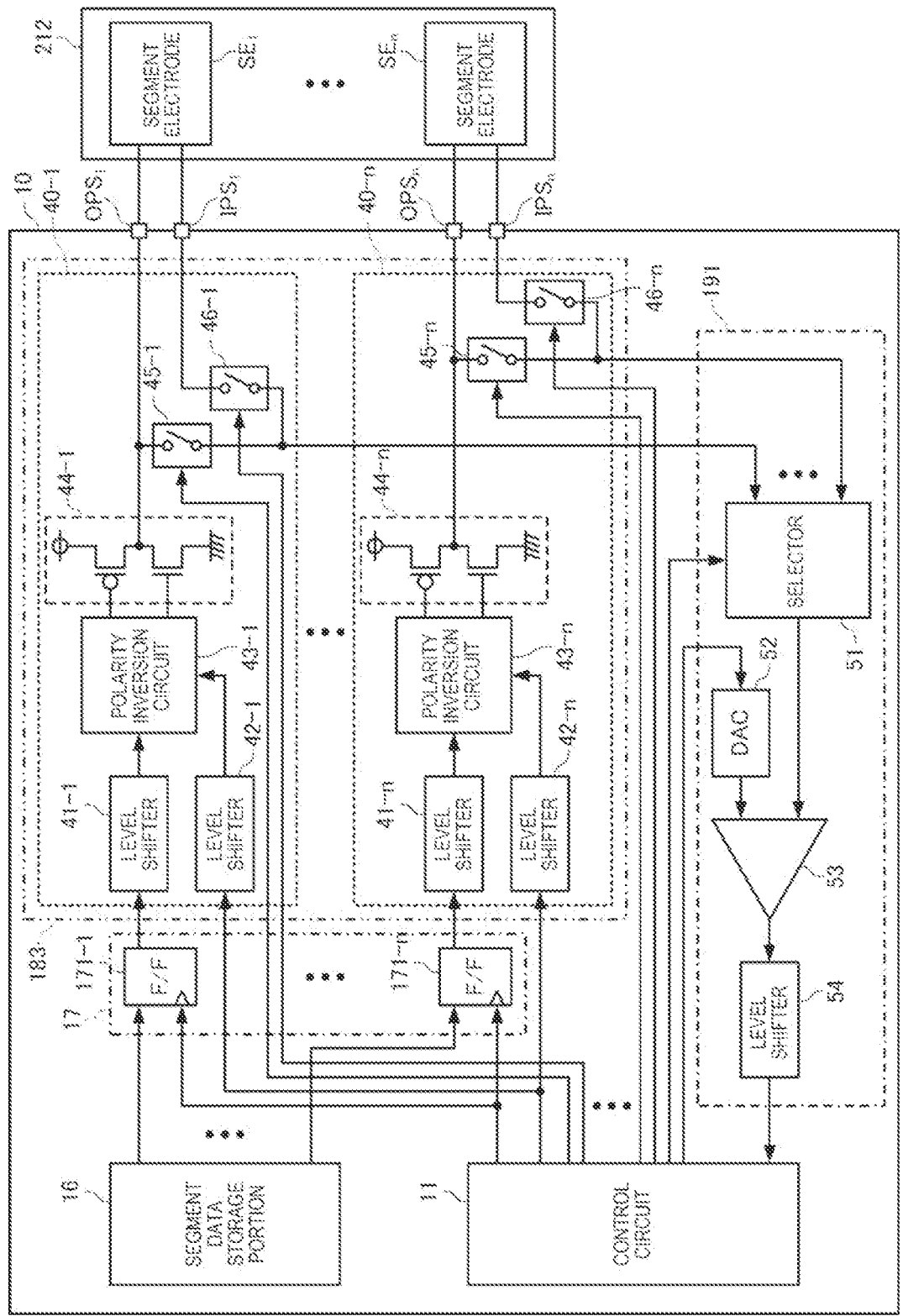
FIG. 7 is a diagram showing an example of a configuration of a part of a segment display portion segment drive circuit and an example of a configuration of a segment abnormality detection circuit.
Figure 8:
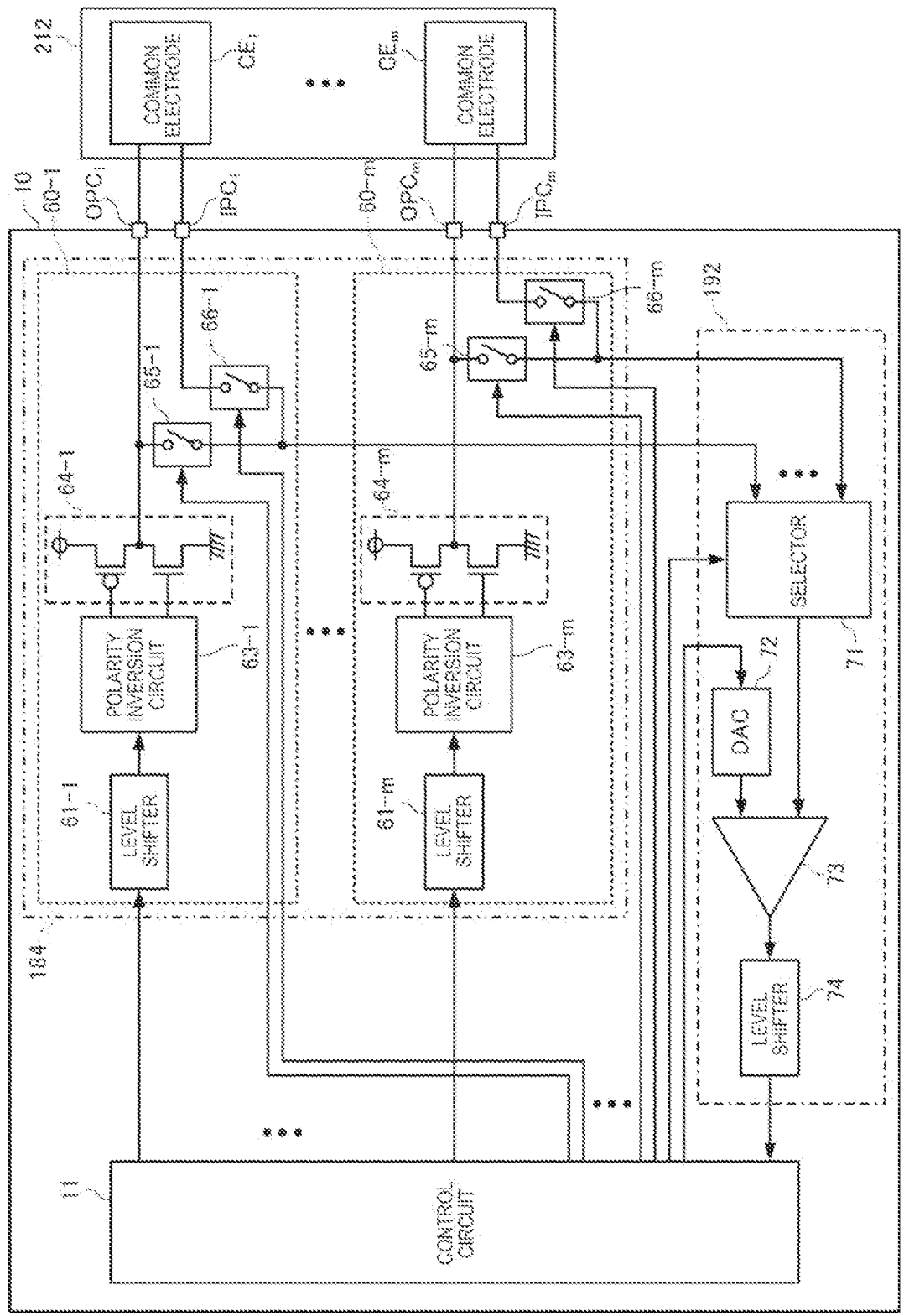
FIG. 8 is a diagram showing an example of a configuration of a part of a segment display portion common drive circuit and an example of a configuration of a common abnormality detection circuit.

FIG. 7 is a diagram showing an example of a configuration of a part of the segment display portion segment drive circuit 183 included in the segment display portion drive circuit 18b and an example of a configuration of the segment abnormality detection circuit 191 included in the display abnormality detection circuit 19.

In the example in FIG. 7, the segment abnormality detection circuit 191 detects an abnormality in each segment drive signal supplied to n segment electrodes $SE_1$ to $SE_n$ provided on the segment display portion 212. n is an integer of 1 or more.

The segment display portion segment drive circuit 183 includes n output portions 40-1 to 40-n that output segment drive signals to the segment electrodes $SE_1$ to $SE_n$, respectively.

For each integer i of 1 or more and n or less, the output portion 40-i generates the segment drive signal based on the signal output from a flip-flop 171-i included in the segment data line latch 17 and the synchronized signal output from the control circuit 11 and outputs the segment drive signal to the segment electrode $SE_i$ via an output terminal $OPS_i$ of the display driver 10. Further, a signal returned from the segment electrode $SE_i$ is input to the output portion 40-i via an input terminal $IPS_i$ of the display driver 10.

The output portion 40-i includes a level shifter 41-i, a level shifter 42-i, a polarity inversion circuit 43-i, a CMOS inverter circuit 44-i, a switch 45-i, and a switch 46-i.

The level shifter 41-i converts a voltage level of the signal output from the flip-flop 171-i into a predetermined voltage level.

The level shifter 42-i converts the voltage level of the synchronized signal output from the control circuit 11 into the predetermined voltage level.

The polarity inversion circuit 43-i synchronizes with the synchronized signal output from the level shifter 42-i and outputs two signals that become a high level or a low level in response to the signal output from the level shifter 41-i.

One signal output from the polarity inversion circuit 43-i is input to a gate of a PMOS transistor of a CMOS inverter circuit 44-i, and the other signal output from the polarity inversion circuit 43-i is input to a gate of an NMOS transistor of the CMOS inverter circuit 44-i.

The signal output from the CMOS inverter circuit 44-i is supplied to the segment electrode $SE_i$ via the output terminal $OPS_i$ as the segment drive signal output from the output portion 40-i.

A first end of a switch 45-*i* is electrically coupled to the output terminal OPS$_i$, and when the switch 45-*i* is in a conductive state, the segment drive signal output from the output portion 40-*i* is input to the segment abnormality detection circuit 191. Further, a first end of a switch 46-*i* is electrically coupled to the input terminal IPS$_i$, and when the switch 46-*i* is in the conductive state, the signal returned from the segment electrode SE$_i$ is input to the segment abnormality detection circuit 191. A second end of the switch 45-*i* and a second end of the switch 46-*i* are electrically coupled to each other, and the switch 45-*i* and the switch 46-*i* are controlled by the control circuit 11 so that one is in the conductive state and the other is in a non-conductive state. For example, the control circuit 11 may control the switches such that the switches 45-1 to 45-*n* are in the conductive state and the switches 46-1 to 46-*n* are in the non-conductive state, or the switches 45-1 to 45-*n* are in the non-conductive state and the switches 46-1 to 46-*n* are in the conductive state.

The segment abnormality detection circuit 191 includes a selector 51, a D/A converter 52, a comparator 53, and a level shifter 54.

The selector 51 receives n signals output one by one from the n output portions 40-1 to 40-*n* and selects and outputs any one of the signals among the n signals under the control of the control circuit 11. For each integer i of 1 or more and n or less, the signal, which is output from the output portion 40-*i* and input to the selector 51, is a segment drive signal output from the CMOS inverter circuit 44-*i* to the output terminal OPS$_i$ when the switch 45-*i* is in the conductive state, and is a signal input to the input terminal IPS$_i$ when the switch 46-*i* is in the conductive state. The control circuit 11 controls the switches 45-1 to 45-*n*, the switches 46-1 to 46-*n*, and the selector 51 such that the n segment drive signals, which are output from the n CMOS inverter circuits 44-1 to 44-*n*, and the n signals, which are input to the n input terminals IPS$_1$ to IPS$_n$, are sequentially selected by the selector 51.

The comparator 53 compares the voltage of the signal output from the selector 51 with the voltage of the signal output from the D/A converter 52 and outputs a signal with a voltage level according to the comparison result. For example, the comparator 53 outputs a signal with a high level when the voltage of the signal output from the selector 51 is higher than the voltage of the signal output from the D/A converter 52 and outputs a signal with a low level when the voltage of the signal output from the selector 51 is lower than the voltage of the signal output from the D/A converter 52.

The D/A converter 52 converts an expected value signal, which is a digital signal input from the control circuit 11, into an analog signal having a voltage corresponding to the value of the expected value signal and outputs the signal. For example, when the voltage of the signal output from the selector 51 is expected to be in the vicinity of the high side liquid crystal drive voltage, the control circuit 11 inputs the expected value signal to the D/A converter 52 such that the voltage of the signal output from the D/A converter 52 is, for example, 80% of the high side liquid crystal drive voltage. In this case, when the voltage of the signal output from the selector 51 is in the vicinity of the high side liquid crystal drive voltage, the signal output from the comparator 53 becomes a high level, and when the voltage of the signal output from the selector 51 is equal to or less than 80% of the high side liquid crystal drive voltage, the signal output from the comparator 53 becomes a low level. Further, when the voltage of the signal output from the selector 51 is expected to be in the vicinity of the low side liquid crystal drive voltage, the control circuit 11 inputs the expected value signal to the D/A converter 52 such that the voltage of the signal output from the D/A converter 52 is, for example, 20% of the high side liquid crystal drive voltage. In this case, when the voltage of the signal output from the selector 51 is in the vicinity of the low side liquid crystal drive voltage, the signal output from the comparator 53 becomes a low level, and when the voltage of the signal output from the selector 51 is equal to or greater than 20% of the high side liquid crystal drive voltage, the signal output from the comparator 53 becomes a high level.

The expected value signal may be input to the D/A converter 52 or the comparator 53 from the segment display portion segment drive circuit 183.

The level shifter 54 converts the voltage level of the signal output from the comparator 53 into a predetermined voltage level and outputs the predetermined voltage level to the control circuit 11.

For each integer i of 1 or more and n or less, in a case in which the signal output from the level shifter 54 becomes a low level when the segment drive signal, which is output from the CMOS inverter circuit 44-*i*, is expected to be in the vicinity of the high side liquid crystal drive voltage, or the signal output from the level shifter 54 becomes a high level when the segment drive signal is expected to be in the vicinity of the low side liquid crystal drive voltage, the abnormality in the segment drive signal output from the CMOS inverter circuit 44-*i* is detected. For example, when the CMOS inverter circuit 44-*i* has a failure, or when the wiring, which couples the output terminal OPS$_i$ and the segment electrode SE$_i$, is short circuited with another wiring, the abnormality in the segment drive signal output from the CMOS inverter circuit 44-*i* is detected.

Further, for each integer i of 1 or more and n or less, in a case in which the signal output from the level shifter 54 becomes a low level when the signal, which is input to the input terminal IPS$_i$, is expected to be in the vicinity of the high side liquid crystal drive voltage, or the signal output from the level shifter 54 becomes a high level when the signal is expected to be in the vicinity of the low side liquid crystal drive voltage, the abnormality in the signal input to the input terminal IPS$_i$ is detected. For example, when the CMOS inverter circuit 44-*i* has a failure, when the wiring, which couples the output terminal OPS$_i$ and the segment electrode SE$_i$, has disconnection or short circuit, or when the wiring, which couples the segment electrode SE$_i$ and the input terminal IPS$_i$, has disconnection or short circuit, the abnormality in the signal input to the input terminal IPS$_i$ is detected.

When the abnormality of at least one of the segment drive signal output from the CMOS inverter circuit 44-*i* and the signal input to the input terminal IPS$_i$ is detected, the segment drive signal supplied to the segment electrode SE$_i$ can be regarded as abnormal. In this way, the segment abnormality detection circuit 191 can detect the abnormality in the segment drive signal supplied to the segment electrode SE$_i$.

FIG. 8 is a diagram showing an example of a configuration of a part of the segment display portion common drive circuit 184 included in the segment display portion drive circuit 18*b* and an example of a configuration of the common abnormality detection circuit 192 included in the display abnormality detection circuit 19.

In the example in FIG. 8, the common abnormality detection circuit 192 detects the abnormality in each common drive signal supplied to m common electrodes $CE_1$ to $CE_m$ provided on the segment display portion 212. m is an integer of 1 or more.

The segment display portion common drive circuit 184 includes m output portions 60-1 to 60-m that output common drive signals to the common electrodes $CE_1$ to $CE_m$, respectively. The common drive signals are sequentially output from the output portions 60-1 to 60-m. The common drive signal is also referred to as a common selection signal.

For each integer j of 1 or more and m or less, the output portion 60-j generates the common drive signal based on the common signal output from the control circuit 11 and outputs the common drive signal to the common electrode CEs via the output terminal $OPC_j$ of the display driver 10. Further, the signal returned from the common electrode $CE_j$ is input to the output portion 60-j via the input terminal $IPC_j$ of the display driver 10.

The output portion 60-j includes a level shifter 61-j, a polarity inversion circuit 63-j, a CMOS inverter circuit 64-j, a switch 65-j, and a switch 66-j.

The level shifter 61-j converts the voltage level of the common signal output from the control circuit 11 into a predetermined voltage level.

The polarity inversion circuit 63-j outputs two signals that become a high level or a low level in response to the signal output from the level shifter 61-j.

One signal output from the polarity inversion circuit 63-j is input to a gate of a PMOS transistor of a CMOS inverter circuit 64-j, and the other signal output from the polarity inversion circuit 63-j is input to a gate of an NMOS transistor of the CMOS inverter circuit 64-j. Further, when a signal with a low level is input to both the gate of the PMOS transistor and the gate of the NMOS transistor, a signal with a high level is output from the CMOS inverter circuit 64-j. In the present embodiment, the signal with a high level may be a common drive signal.

The signal with a high level or low level output from the CMOS inverter circuit 64-j is supplied to the common electrode $CE_j$ via the output terminal $OPC_j$ as the common drive signal output from the output portion 60-j. The common drive signals are sequentially supplied to the common electrodes $CE_1$ to $CE_m$, one by one.

A first end of a switch 65-j is electrically coupled to the output terminal $OPC_j$, and when the switch 65-j is in the conductive state, the common drive signal output from the output portion 60-j is input to the common abnormality detection circuit 192. Further, a first end of a switch 66-j is electrically coupled to the input terminal $IPC_j$, and when the switch 66-j is in the conductive state, a signal returned from the common electrode $CE_j$ is input to the common abnormality detection circuit 192. A second end of the switch 65-j and a second end of the switch 66-j are electrically coupled to each other, and the switch 65-j and the switch 66-j are controlled by the control circuit 11 so that one is in the conductive state and the other is in a non-conductive state. For example, the control circuit 11 may control the switches such that the switches 65-1 to 65-m are in the conductive state and the switches 66-1 to 66-m are in the non-conductive state, or the switches 65-1 to 65-m are in the non-conductive state and the switches 66-1 to 66-m are in the conductive state.

The common abnormality detection circuit 192 includes a selector 71, a D/A converter 72, a comparator 73, and a level shifter 74.

The selector 71 receives m signals output one by one from the m output portions 60-1 to 60-m and selects and outputs any one of the signals among the m signals under the control of the control circuit 11. For each integer j of 1 or more and m or less, the signal, which is output from the output portion 60-j and input to the selector 71, is a common drive signal output from the CMOS inverter circuit 64-j to the output terminal $OPC_j$ when the switch 65-j is in the conductive state, and is a signal input to the input terminal $IPC_j$ when the switch 66-j is in the conductive state. The control circuit 11 controls the switches 65-1 to 65-m, the switches 66-1 to 66-m, and the selector 71 such that the m common drive signals, which are output from the m CMOS inverter circuits 64-1 to 64-m, and the m signals, which are input to the m input terminals $IPC_1$ to $IPC_m$, are sequentially selected by the selector 71.

The comparator 73 compares the voltage of the signal output from the selector 71 with the voltage of the signal output from the D/A converter 72 and outputs a signal with a voltage level according to the comparison result. For example, the comparator 73 outputs a signal with a high level when the voltage of the signal output from the selector 71 is higher than the voltage of the signal output from the D/A converter 72 and outputs a signal with a low level when the voltage of the signal output from the selector 71 is lower than the voltage of the signal output from the D/A converter 72.

The D/A converter 72 converts an expected value signal, which is a digital signal input from the control circuit 11, into an analog signal having a voltage corresponding to the value of the expected value signal and outputs the signal. For example, when the voltage of the signal output from the selector 71 is expected to be in the vicinity of the high side liquid crystal drive voltage, the control circuit 11 inputs the expected value signal to the D/A converter 72 such that the voltage of the signal output from the D/A converter 72 is, for example, 80% of the high side liquid crystal drive voltage. In this case, when the voltage of the signal output from the selector 71 is in the vicinity of the high side liquid crystal drive voltage, the signal output from the comparator 73 becomes a high level, and when the voltage of the signal output from the selector 71 is equal to or less than 80% of the high side liquid crystal drive voltage, the signal output from the comparator 73 becomes a low level. Further, when the voltage of the signal output from the selector 71 is expected to be in the vicinity of the low side liquid crystal drive voltage, the control circuit 11 inputs the expected value signal to the D/A converter 72 such that the voltage of the signal output from the D/A converter 72 is, for example, 20% of the high side liquid crystal drive voltage. In this case, when the voltage of the signal output from the selector 71 is in the vicinity of the low side liquid crystal drive voltage, the signal output from the comparator 73 becomes a low level, and when the voltage of the signal output from the selector 71 is equal to or greater than 20% of the high side liquid crystal drive voltage, the signal output from the comparator 73 becomes a high level.

The expected value signal may be input to the D/A converter 72 or the comparator 73 from the segment display portion common drive circuit 184.

The level shifter 74 converts the voltage level of the signal output from the comparator 73 into a predetermined voltage level and outputs the predetermined voltage level to the control circuit 11.

For each integer j of 1 or more and m or less, in a case in which the signal output from the level shifter 74 becomes a low level when the common drive signal, which is output from the CMOS inverter circuit 64-j, is expected to be in the vicinity of the high side liquid crystal drive voltage, or the signal output from the level shifter 74 becomes a high level when the common drive signal is expected to be in the vicinity of the low side liquid crystal drive voltage, the abnormality in the common drive signal output from the CMOS inverter circuit 64-$j$ is detected. For example, when the CMOS inverter circuit 64-$j$ has a failure, or when the wiring, which couples the output terminal OPC$_j$ and the common electrode CE$_j$, is short circuited with another wiring, the abnormality in the common drive signal output from the CMOS inverter circuit 64-$j$ is detected.

Further, for each integer j of 1 or more and m or less, in a case in which the signal output from the level shifter 74 becomes a low level when the signal, which is input to the input terminal IPC$_j$, is expected to be in the vicinity of the high side liquid crystal drive voltage, or the signal output from the level shifter 74 becomes a high level when the signal is expected to be in the vicinity of the low side liquid crystal drive voltage, the abnormality in the signal input to the input terminal IPC$_j$ is detected. For example, when the CMOS inverter circuit 64-$j$ has a failure, when the wiring, which couples the output terminal OPC$_j$ and the common electrode CE$_j$, has disconnection or short circuit, or when the wiring, which couples the common electrode CE$_j$ and the input terminal IPC$_j$, has disconnection or short circuit, the abnormality in the signal input to the input terminal IPC$_j$ is detected.

When the abnormality of at least one of the common drive signal output from the CMOS inverter circuit 64-$j$ and the signal input to the input terminal IPCs is detected, the common drive signal supplied to the common electrode CE$_j$ can be regarded as abnormal. In this way, the common abnormality detection circuit 192 can detect the abnormality in the common drive signal supplied to the common electrode CE$_j$.

Further, for example, it is assumed that when the first icon is displayed by the segment electrode SE$_1$ and the common electrode CE$_1$, the display abnormality detection circuit 19 detects an abnormality in the segment drive signal supplied to the segment electrode SE$_1$ by the segment abnormality detection circuit 191 and detects a display abnormality of the first icon when the common abnormality detection circuit 192 detects an abnormality in the common drive signal supplied to the common electrode CE$_1$.

When the integer n is 2 or more in FIG. 7, the display abnormality detection circuit 19 can detect the display abnormalities of a plurality of icons including the first icon. On the other hand, the integer n may be 1 in FIG. 7, and the integer m may be 1 in FIG. 8. That is, the display abnormality detection circuit 19 may detect only the display abnormality of the first icon. In this case, the selector 51 of the segment abnormality detection circuit 191 or the selector 71 of the common abnormality detection circuit 192 is unnecessary, and since all the wirings coupled to the selector 51 or the selector 71 are unnecessary, the size of the display abnormality detection circuit 19 can be reduced.

Based on the signal output from the level shifter 54 and the signal output from the level shifter 74, the control circuit 11 determines whether or not the display abnormality of each of the predetermined icons including the first icon that can be displayed on the segment display portion 212 is detected, and sets a flag indicating that the display abnormality is detected in a register (not shown) for the icon in which the display abnormality is detected.

Instead of the example of the configuration in FIG. 7, for each integer i of 1 or more and n or less, the segment abnormality detection circuit 191 may be configured such that the output portion 40-$i$ includes the D/A converter 52-$i$ and the comparator 53-$i$, n signals output from n comparators 53-1 to 53-$n$ are input to the selector 51, the signal output from the selector 51 is input to the level shifter 54, and the signal output from the level shifter 54 is input to the control circuit 11. The comparator 53-$i$ receives the segment drive signal that is output from the CMOS inverter circuit 44-$i$ when the switch 45-$i$ is in the conductive state or the signal that is input to the input terminal IPS$_j$ when the switch 46-$i$ is in the conductive state as one input signal and receives the signal that is output from the D/A converter 52-$i$ as the other input signal.

Similarly, instead of the example of the configuration in FIG. 8, for each integer j of 1 or more and m or less, the common abnormality detection circuit 192 may be configured such that the output portion 60-$j$ includes the D/A converter 72-$j$ and the comparator 73-$j$, m signals output from m comparators 73-1 to 73-$m$ are input to the selector 71, the signal output from the selector 71 is input to the level shifter 74, and the signal output from the level shifter 74 is input to the control circuit 11. The comparator 73-$j$ receives the common drive signal that is output from the CMOS inverter circuit 64-$j$ when the switch 65-$j$ is in the conductive state or the signal that is input to the input terminal IPC$_j$ when the switch 66-$j$ is in the conductive state as one input signal and receives the signal that is output from the D/A converter 72-$j$ as the other input signal.

1-3. Operation Procedure of Display Driver

Figure 9:
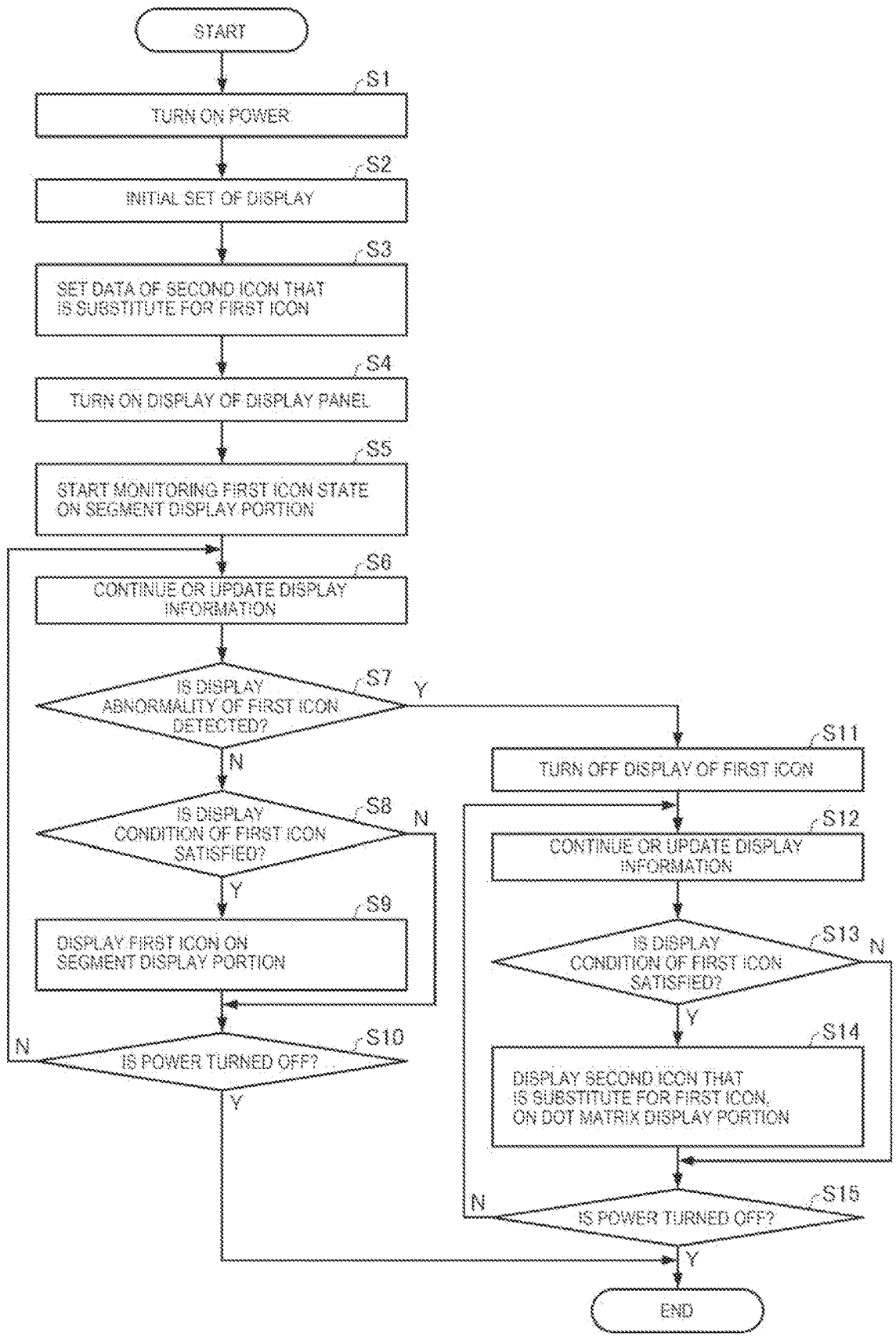
FIG. 9 is a flowchart showing an example of an operation procedure of the display driver.

FIG. 9 is a flowchart showing an example of an operation procedure of the display driver 10. As shown in FIG. 9, when the power of the display driver 10 is turned on in step S1, first, the display driver 10 initially sets the information to be displayed on the display panel 21 in step S2. Specifically, the processing unit 30 transmits data of the information to be initially displayed on the dot matrix display portion 211 to the display driver 10, and in the display driver 10, the control circuit 11 writes the data in the first storage region 14$a$ of the dot matrix data storage portion 14. Further, the processing unit 30 transmits the data of the display object to be initially displayed on the segment display portion 212 to the display driver 10, and in the display driver 10, the control circuit 11 writes the data in the segment data storage portion 16.

Next, in step S3, the display driver 10 sets the data of the second icon that is a substitute for the first icon. Specifically, the processing unit 30 transmits the data for second icon display, which is data for displaying the second icon that is a substitute for the first icon, on the dot matrix display portion 211, to the display driver 10, and in the display driver 10, the control circuit 11 writes the data in the second storage region 14$b$ of the dot matrix data storage portion 14.

Next, the display driver 10 turns on the display of the display panel 21 in step S4. Specifically, in the display driver 10, the control circuit 11 sequentially transfers the data written in the first storage region 14$a$ of the dot matrix data storage portion 14 in step S2 to the dot matrix display portion segment drive circuit 181 via the dot matrix data line latch 15 and outputs each common signal to the dot matrix display portion common drive circuit 182. Thereafter, the dot matrix display portion segment drive circuit 181 generates each segment signal based on the transferred data and outputs the segment signal to the dot matrix display portion 211, and the dot matrix display portion common drive circuit 182 generates each common drive signal based on each common signal and outputs each common drive signal to the dot matrix display portion 211. As a result, the information is displayed on the dot matrix display portion 211. Similarly, in the display driver 10, the control circuit 11 sequentially transfers the data written in the segment data storage portion 16 in step S2 to the segment display portion segment drive circuit 183 via the segment data line latch 17 and outputs each common signal to the segment display portion common drive circuit 184. Thereafter, the segment display portion segment drive circuit 183 generates each segment signal based on the transferred data and outputs each segment signal to the segment display portion 212, and the segment display portion common drive circuit 184 generates each common drive signal based on each common signal and outputs each common drive signal to the segment display portion 212. As a result, the display object is displayed on the segment display portion 212.

Next, in step S5, the display driver 10 starts monitoring the state of the first icon of the segment display portion 212. Specifically, in the display driver 10, the display abnormality detection circuit 19 starts an operation for detecting the display abnormality of the first icon.

Next, in step S6, the display driver 10 continues or updates the display information of the dot matrix display portion 211 and the segment display portion 212. Specifically, the processing unit 30 does not transmit new data to the display driver 10 when continuing the display information and transmits data for updating the display information to the display driver 10 when updating the display information. When new data is not transmitted from the processing unit 30 to the dot matrix display portion 211, the display driver 10 continues the same process as in step S4 based on the data stored in the first storage region 14a of the dot matrix data storage portion 14 and the data stored in the segment data storage portion 16. On the other hand, when data for updating the information displayed on the dot matrix display portion 211 is transmitted from the processing unit 30, in the display driver 10, the control circuit 11 writes the data in the first storage region 14a of the dot matrix data storage portion 14. Further, when data for updating the display object displayed on the segment display portion 212 is transmitted from the processing unit 30, in the display driver 10, the control circuit 11 writes the data in the segment data storage portion 16. In the display driver 10, the process after the control circuit 11 writes data to the first storage region 14a of the dot matrix data storage portion 14 or the segment data storage portion 16, is the same as in step S4.

Next, in a case in which the display abnormality of the first icon is not detected in step S7 when a display condition of the first icon is satisfied in step S8, the display driver 10 displays the first icon on the segment display portion 212 in step S9. Specifically, the processing unit 30 transmits the data for first icon display, which is data for displaying the first icon on the segment display portion 212, to the display driver 10, and in the display driver 10, the control circuit 11 writes the data for first icon display in the segment data storage portion 16. Further, the control circuit 11 sequentially transfers the data for first icon display, which is written in the segment data storage portion 16, to the segment display portion segment drive circuit 183 via the segment data line latch 17 and outputs each common signal to the segment display portion common drive circuit 184. Thereafter, the segment display portion segment drive circuit 183 generates each segment signal based on the transferred data for first icon display and outputs each segment signal to the segment display portion 212, and the segment display portion common drive circuit 184 generates each common drive signal based on each common signal and outputs each common drive signal to the segment display portion 212. As a result, the first icon is displayed on the segment display portion 212.

Next, in step S10, the display driver 10 returns to step S6 when the power is not turned off and ends the operation when the power is turned off.

Further, when the display abnormality of the first icon is detected in step S7, the display driver 10 turns off the display of the first icon in step S11. Specifically, in the display driver 10, the control circuit 11 controls the segment display portion drive circuit 18b such that the first icon is not displayed on the segment display portion 212. As a result, the first icon is no longer displayed on the segment display portion 212 thereafter.

Next, in step S12, the display driver 10 continues or updates the display information of the dot matrix display portion 211 and the segment display portion 212. In step S12, the process performed by the display driver 10 is the same as that in step S6.

Next, when the display condition of the first icon is satisfied in step S13, instead of displaying the first icon on the segment display portion 212, the display driver 10 displays the second icon that is a substitute for the first icon on the dot matrix display portion 211 in step S14. Specifically, in the display driver 10, the control circuit 11 transfers the data for second icon display, which is written in the second storage region 14b of the dot matrix data storage portion 14 in step S3, to the dot matrix display portion segment drive circuit 181 via the dot matrix data line latch 15 and outputs each common signal to the dot matrix display portion common drive circuit 182. Thereafter, the dot matrix display portion segment drive circuit 181 generates each segment signal based on the transferred data for second icon display and outputs the segment signal to the dot matrix display portion 211, and the dot matrix display portion common drive circuit 182 generates each common drive signal based on each common signal and outputs each common drive signal to the dot matrix display portion 211. As a result, instead of displaying the first icon on the segment display portion 212, the second icon is displayed on the dot matrix display portion 211.

Next, in step S15, the display driver 10 returns to step S12 when the power is not turned off and ends the operation when the power is turned off.

In FIG. 9, although the operation procedure focusing on the display of the first icon and the second icon is shown, the operation procedure for displaying the icons other than the first icon and the substitutive icons is also the same.

Figure 10:
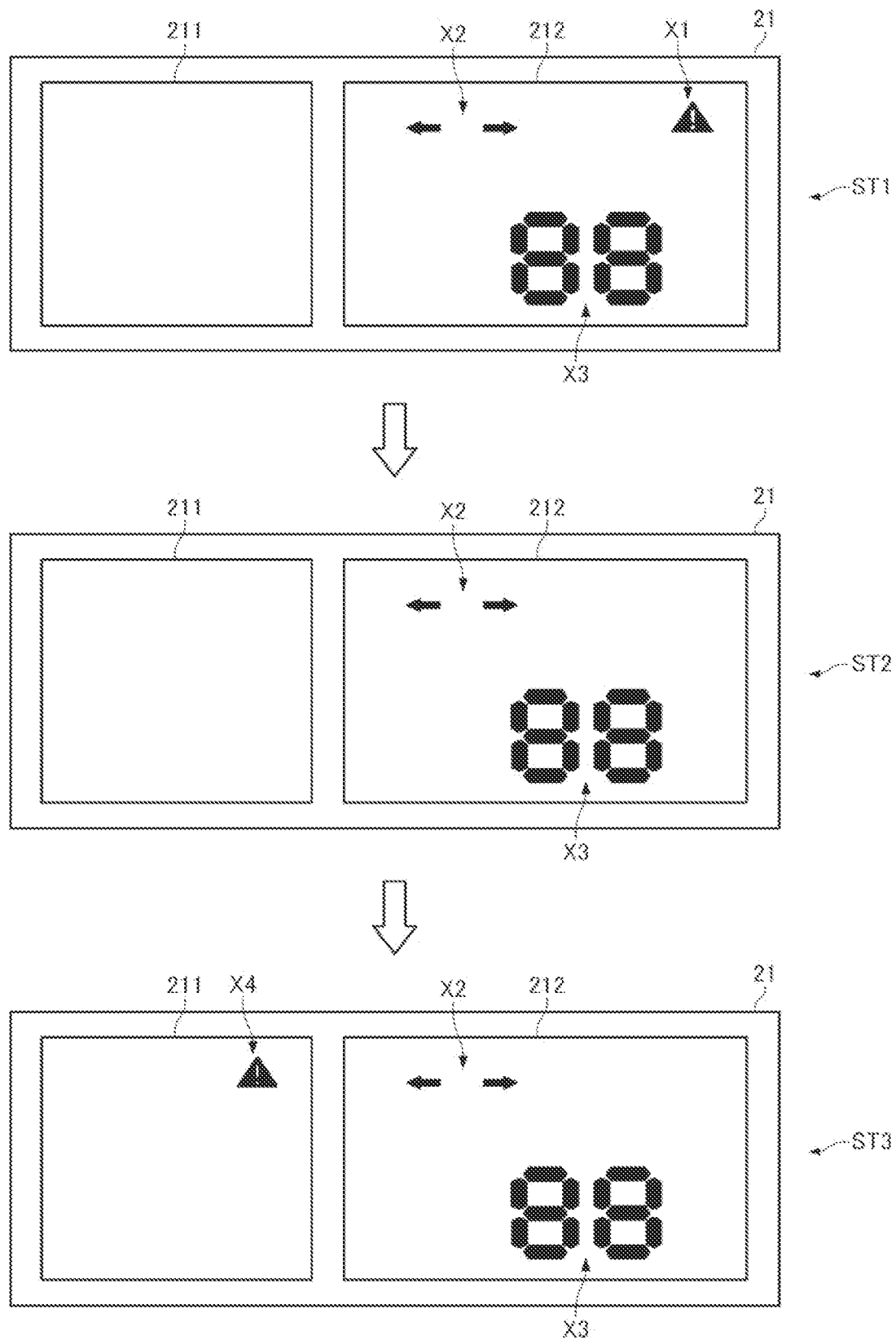
FIG. 10 is a diagram showing an example in which information displayed on a display panel changes by a display abnormality displayed on an icon.

FIG. 10 shows an example in which the information displayed on the display panel 21 shown in FIG. 2 changes by the display abnormality on the icon. In the example in FIG. 10, first, in the normal display state ST1, three display objects X1, X2, and X3 are displayed on the segment display portion 212. In the display state ST1, some information such as position information, weather information, news, or the like may or may not be displayed on the dot matrix display portion 211.

Next, in the display state ST1, a display abnormality occurs in the display object X1 which is the first icon, and the state transitions to the display state ST2 in which the display object X1 is not displayed.

Next, the state transitions to the display state ST3 in which a dot pattern X4 of the second icon, which is the substitute for the first icon, is displayed on the dot matrix display portion 211.

The shape and color of the second icon are not particularly limited. In the example in FIG. 10, the shape and color of the dot pattern X4, which is the second icon, is almost the same as that of the display object X1 which is the first icon.

Figure 11:
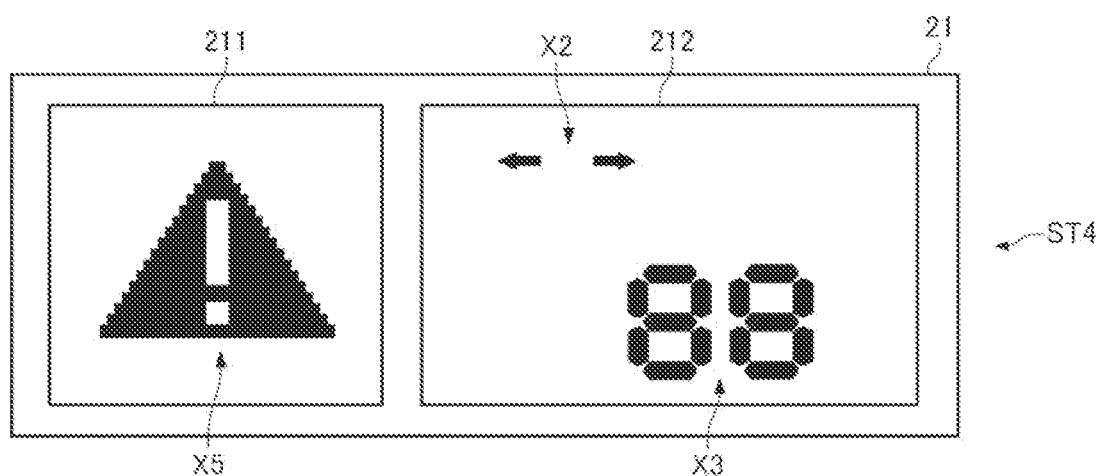
FIG. 11 is a diagram showing an example of information displayed on the display panel by a display abnormality displayed on an icon.
Figure 11:
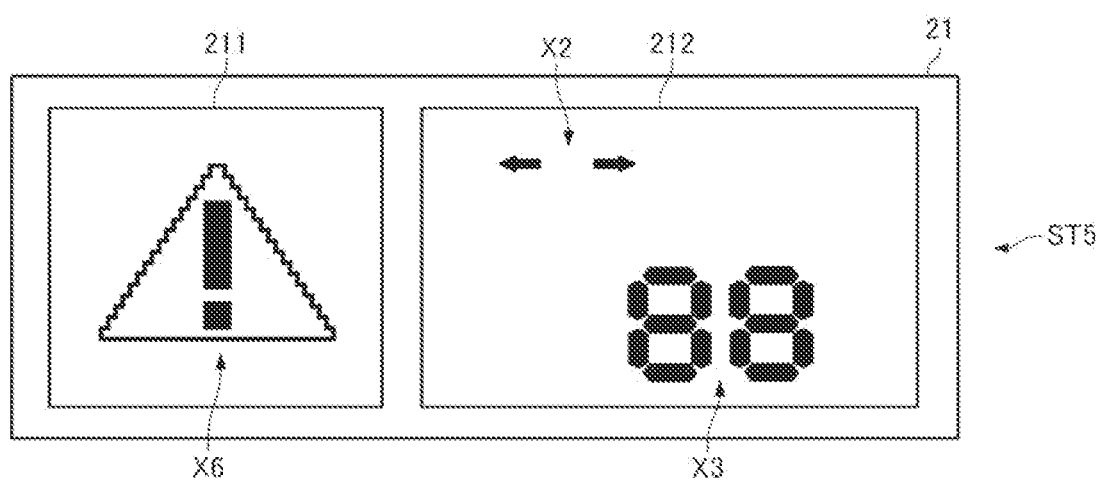

Further, at least one of the shape and display color of the second icon may be different from that of the first icon. For example, the display state ST3 in FIG. 10 may be replaced with the display state ST4 or the display state ST5 in FIG. 11. In the display state ST4 in FIG. 11, the color of the dot pattern X5, which is the second icon, is almost the same as that of the display object X1, which is the first icon, but the shape, particularly the size of the dot pattern X5 is different from that of the display object X1. Further, in the display state ST5 in FIG. 11, both the shape and the color of the dot pattern X6, which is the second icon, are different from those of the display object X1 which is the first icon. In the dot matrix display portion 211, the visibility of the second icon can be improved by setting the second icon to an appropriate color or shape with respect to the background of the display portion.

1-4. Operational Effects

As described above, in the display driver 10 of the present embodiment, the data for second icon display is stored in the dot matrix data storage portion 14 before the display abnormality of the first icon is detected, and in a case in which the control circuit 11 detects the display abnormality of the first icon, when the data for first icon display is written in the segment data storage portion 16, the control circuit 11 transfers the data for second icon display from the dot matrix data storage portion 14 to the dot matrix display portion drive circuit 18a. As a result, when the control circuit 11 detects the display abnormality of the first icon, instead of displaying the first icon on the segment display portion 212, the second icon that is the substitute for the first icon is displayed on the dot matrix display portion 211. Therefore, according to the display driver 10 of the present embodiment, even when the display abnormality occurs in the first icon, it is possible to continue displaying the appropriate information by displaying or not displaying the second icon. Further, according to the display driver 10 of the present embodiment, when the display abnormality of the first icon is detected, the processing unit 30 does not need to transmit the data for second icon display to the control circuit 11, the second icon can be displayed on the dot matrix display portion 211 independently, and the time until the second icon is displayed on the dot matrix display portion 211 can be shortened.

Further, in the display driver 10 of the present embodiment, the dot matrix data storage portion 14 includes a first storage region 14a in which the display information data to be displayed on the dot matrix display portion 211 transmitted from the processing unit 30 is written, and a second storage region 14b in which the data for second icon display is stored. Therefore, according to the display driver 10 of the present embodiment, in the dot matrix data storage portion 14, since the region where the data for second icon display is stored is separated from the region where the display information data is written, the possibility that the data for second icon display is overwritten and lost is reduced.

Further, in the display driver 10 of the present embodiment, the control circuit 11 detects the display abnormality of the first icon by the display abnormality detection circuit 19 detecting the display abnormality of the first icon. Therefore, according to the display driver 10 of the present embodiment, the control circuit 11 does not receive the signal indicating the display abnormality of the first icon from the external device of the display driver 10 and can display the second icon on the dot matrix display portion 211.

Further, in the display driver 10 of the present embodiment, when the control circuit 11 detects the display abnormality of the first icon, the control circuit 11 controls the segment display portion drive circuit 18b such that the first icon is not displayed on the segment display portion 212. Therefore, according to the display driver 10 of the present embodiment, it is possible to prevent the first icon from being erroneously displayed by the display abnormality of the first icon in a situation where the first icon should not be displayed.

Further, in the display driver 10 of the present embodiment, when the display abnormality detection circuit 19 detects only the display abnormality of the first icon, the number of wirings or circuit elements of the display abnormality detection circuit 19 is reduced, thereby the size of the display abnormality detection circuit 19 can be reduced.

Further, in the display driver 10 of the present embodiment, when the control circuit 11 detects the display abnormality of the first icon, the control circuit 11 transmits the signal indicating the display abnormality of the first icon to the processing unit 30 outside of the display driver 10. Therefore, according to the display driver 10 of the present embodiment, by receiving the signal indicating the display abnormality of the first icon, the processing unit 30 can display the information different from the second icon, for example, the information related to the response that a user should take to the display of the second icon, or the like on the dot matrix display portion 211.

Further, according to the display driver 10 of the present embodiment, by making at least one of the shape and the display color of the second icon, which is displayed on the dot matrix display portion 211, different from that of the first icon and making the color or shape appropriate for the background of the display portion thereof, the visibility of the second icon can be improved.

Further, according to the display driver 10 of the present embodiment, by setting the first icon as an icon for warning display, the possibility that a serious situation occurs because the warning light is erroneously displayed or not displayed on the segment display portion 212, is reduced.

1-5. Modification Example

1-5-1. First Modification Example

In the above embodiment, the control circuit 11 detects the display abnormality of the first icon by detecting the display abnormality of the first icon by the display abnormality detection circuit 19 but the control circuit 11 may detect the display abnormality of the first icon by receiving the signal indicating the display abnormality of the first icon input from the outside of the display driver 10. For example, the integrated circuit device including a circuit for detecting the display abnormality of the first icon may exist outside the display driver 10, and the control circuit 11 may receive the signal indicating the display abnormality of the first icon output from the integrated circuit device to the display driver 10.

1-5-2. Second Modification Example

In the above embodiment, the display 20 includes a single display panel 21 provided with the segment display portion 212 and a dot matrix display portion 211, but the display 20 may include a first display panel provided with the segment display portion 212 and a second display panel, which is different from the first display panel, provided with the dot matrix display portion 211. Further, the display 20 may include a display portion such as an LED together with the display panel 21. LED is an abbreviation for Light Emitting Diode.

1-5-3. Third Modification Example

In the above embodiment, one display driver 10 controls the display 20, but two display drivers may control the display 20.

Figure 12:
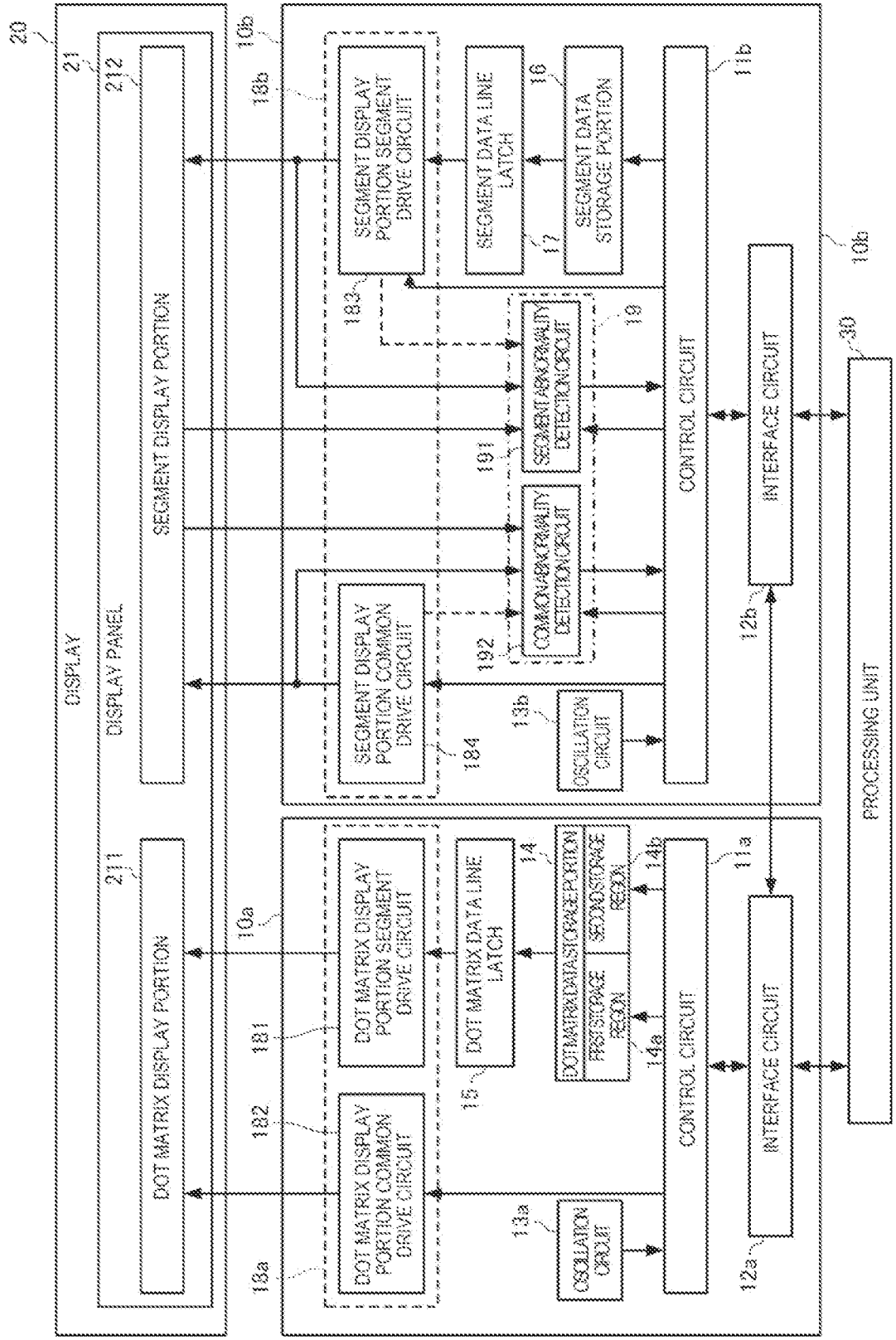
FIG. 12 is a diagram showing an example of a configuration of a display driver of a modification example.

FIG. 12 is a diagram showing an example of a configuration of two display drivers of the third modification example. In FIG. 12, the same components as those in FIG. 1 are designated by the same reference numerals.

As shown in FIG. 12, the first display driver 10a includes a control circuit 11a, an interface circuit 12a, an oscillation circuit 13a, a dot matrix data storage portion 14, a dot matrix data line latch 15, and a dot matrix display portion drive circuit 18a. The dot matrix display portion drive circuit 18a includes a dot matrix display portion segment drive circuit 181 and a dot matrix display portion common drive circuit 182. In the present modification example, the first display driver 10a is an integrated circuit device, and the control circuit 11a, the interface circuit 12a, the oscillation circuit 13a, the dot matrix data storage portion 14, the dot matrix data line latch 15, and the dot matrix display portion drive circuit 18a are included in the integrated circuit device.

The interface circuit 12a is a circuit for establishing data communication between the processing unit 30 provided outside the first display driver 10a and the control circuit 11a.

The oscillation circuit 13a generates a clock signal for operating the control circuit 11a. The oscillation circuit 13a may be, for example, a CR oscillation circuit.

The control circuit 11a controls the dot matrix display portion drive circuit 18a based on the clock signal output from the oscillation circuit 13a.

Specifically, the control circuit 11a controls the dot matrix display portion drive circuit 18a as follows. First, the processing unit 30 transmits the display information data for one screen to be displayed on the dot matrix display portion 211 to the control circuit 11a, and the control circuit 11a receives the display information data via the interface circuit 12a. Next, the control circuit 11a writes the received display information data in the first storage region 14a of the dot matrix data storage portion 14. Next, the control circuit 11a sequentially designates each address of the first storage region 14a of the dot matrix data storage portion 14 and transfers each dot line data from the first storage region 14a of the dot matrix data storage portion 14 to the dot matrix data line latch 15. Thereafter, the dot matrix display portion segment drive circuit 181 of the dot matrix display portion drive circuit 18a generates and outputs each segment drive signal for dot matrix display based on the dot line data stored in the dot matrix data line latch 15. In this way, the control circuit 11a causes the dot matrix display portion 211 to output each segment drive signal for displaying the display information for one screen. Further, the control circuit 11a causes the dot matrix display portion common drive circuit 182 of the dot matrix display portion drive circuit 18a to synchronize with each segment drive signal and causes the dot matrix display portion 211 to output each common drive signal for displaying the display information for one screen.

The second display driver 10b includes a control circuit 11b, an interface circuit 12b, an oscillation circuit 13b, a segment data storage portion 16, a segment data line latch 17, a segment display portion drive circuit 18b, and a display abnormality detection circuit 19. The segment display portion drive circuit 18b includes a segment display portion segment drive circuit 183 and a segment display portion common drive circuit 184. Further, the display abnormality detection circuit 19 includes a segment abnormality detection circuit 191 and a common abnormality detection circuit 192. In the present embodiment, the second display driver 10b is an integrated circuit device, and the control circuit 11b, the interface circuit 12b, the oscillation circuit 13b, the segment data storage portion 16, the segment data line latch 17, the segment display portion drive circuit 18b, and the display abnormality detection circuit 19 are included in the integrated circuit device.

The interface circuit 12b is a circuit for establishing data communication between the processing unit 30 provided outside the second display driver 10b and the control circuit 11b.

The oscillation circuit 13b generates a clock signal for operating the control circuit 11b. The oscillation circuit 13b may be, for example, a CR oscillation circuit.

The control circuit 11b controls the segment display portion drive circuit 18b based on the clock signal output from the oscillation circuit 13b.

Specifically, the control circuit 11b controls the segment display portion drive circuit 18b as follows. First, the processing unit 30 transmits the data of the display object for one screen to be displayed on the segment display portion 212 to the control circuit 11b, and the control circuit 11b receives the data of the display object via the interface circuit 12b. Next, the control circuit 11b writes the received data of the display object to the segment data storage portion 16. Next, the control circuit 11b sequentially designates each address of the segment data storage portion 16 and transfers each segment line data from the segment data storage portion 16 to the segment data line latch 17. Thereafter, the segment display portion segment drive circuit 183 of the segment display portion drive circuit 18b generates and outputs each segment drive signal for segment display based on the segment line data stored in the segment data line latch 17. In this way, the control circuit 11b causes the segment display portion 212 to output each segment drive signal for displaying the display object for one screen. Further, the control circuit 11b causes the segment display portion common drive circuit 184 of the segment display portion drive circuit 18b to synchronize with each segment drive signal and causes the segment display portion 212 to output each common drive signal for displaying the display information for one screen.

In the present modification example, when the power of the first display driver 10a and the second display driver 10b are turned on, the processing unit 30 transmits data of the information to be initially displayed on the dot matrix display portion 211 to the first display driver 10a, and in the first display driver 10a, the control circuit 11a writes the data in the first storage region 14a of the dot matrix data storage portion 14. Further, the processing unit 30 transmits the data for displaying each icon, which is a substitute for each of the predetermined icons on the dot matrix display portion 211, to the first display driver 10a, and in the first display driver 10a, the control circuit 11a writes the data in the second storage region 14b of the dot matrix data storage portion 14.

After that, the initial information is displayed on the dot matrix display portion 211. At this point, the second storage region 14*b* of the dot matrix data storage portion 14 stores the data of the icon which is a substitute for each icon that can be displayed on the segment display portion 212, including the data for second icon display.

In a case in which the control circuit 11*b* detects the display abnormality of any of the icons, that is, the display abnormality of any of the icons is detected by the display abnormality detection circuit 19, when the data for displaying the icon in which the display abnormality is detected on the segment display portion 212, is written in the segment data storage portion 16, the control circuit 11*b* transmits the control signal for displaying the icon that is a substitute for the icon on the dot matrix display portion 211 to the control circuit 11*a* of the first display driver 10*a* via the interface circuit 12*b*. The control circuit 11*a* receives the control signal via the interface circuit 12*a* and transfers the data of the icon that is a substitute for the icon, in which the display abnormality is detected, from the second storage region 14*b* of the dot matrix data storage portion 14 to the dot matrix display portion drive circuit 18*a*. For example, in a case in which the control circuit 11*b* detects the display abnormality of the first icon, when the data for first icon display is written in the segment data storage portion 16, the control circuit 11*b* transmits the control signal for displaying the second icon on the dot matrix display portion 211 to the control circuit 11*a* of the first display driver 10*a* via the interface circuit 12*b*. The control circuit 11*a* receives the control signal via the interface circuit 12*a* and transfers the data for second icon display from the second storage region 14*b* of the dot matrix data storage portion 14 to the dot matrix display portion drive circuit 18*a*. The dot matrix display portion segment drive circuit 181 outputs a segment drive signal corresponding to the data for second icon display to the dot matrix display portion 211. As a result, instead of displaying the first icon on the segment display portion 212, the second icon is displayed on the dot matrix display portion 211.

Further, when the control circuit 11*b* detects the display abnormality of any of the icons, that is, when the display abnormality of any of the icons is detected by the display abnormality detection circuit 19, the control circuit 11*b* controls the segment display portion drive circuit 18*b* such that the icon, in which the display abnormality is detected, is not displayed on the segment display portion 212. For example, when the control circuit 11*b* detects the display abnormality of the first icon, the control circuit 11*b* controls the segment display portion drive circuit 18*b* such that the first icon is not displayed on the segment display portion 212. As a result, the first icon is not displayed on the segment display portion 212.

Further, when the control circuit 11*b* detects the display abnormality of any of the icons, the control circuit 11*b* transmits a signal indicating the display abnormality of the icon to the outside of the display driver 10. Specifically, when the control circuit 11*b* detects the display abnormality of the icon, the control circuit 11*b* sets a flag indicating that the display abnormality of the icon is detected, in a register (not shown). Further, the control circuit 11*b* may transmit a signal indicating the display abnormality to the processing unit 30 via the interface circuit 12. By periodically or receiving a signal indicating the display abnormality, and sequentially reading the flag for each icon, the processing unit 30 can identify the icon in which the display abnormality is detected. For example, when the control circuit 11*b* detects the display abnormality of the first icon, the control circuit 11*b* transmits a signal indicating the display abnormality of the first icon to the outside of the display driver 10.

When the control circuit 11*b* detects the display abnormality of the first icon, the control circuit 11*b* may spontaneously transmit the signal indicating the display abnormality of the first icon to the outside of the display driver 10 or transmit the signal such as a flag indicating the display abnormality of the first icon to the outside of the display driver 10 in response to a request from the outside of the display driver 10. By receiving the signal indicating the display abnormality of the first icon, the processing unit 30 can display the information different from the second icon, for example, the information related to the response that a user should take to the display of the second icon on the dot matrix display portion 211.

Since other configurations and functions of the third modification example are the same as those of the above embodiment, the description thereof will be omitted.

In the example of the configuration shown in FIG. 12, immediately after the power of the first display driver 10*a* and the second display driver 10*b* are turned on, the data of the icon, which is a substitute for each icon, transmitted from the processing unit 30 is written to the second storage region 14*b* of the dot matrix data storage portion 14 but the data may be written in the second storage region 14*b* of the dot matrix data storage portion 14 by using any other method. For example, as shown in FIGS. 5 and 6, immediately after the power of the first display driver 10*a* and the second display driver 10*b* are turned on, the control circuit 11*b* may read the data from the ROM provided outside or inside the display driver 10 and write the data in the second storage region 14*b* of the dot matrix data storage portion 14.

1-5-4. Fourth Modification Example

When the display abnormality is detected on a second display that is different from the display 20, display driver 10 may display a third icon which is a substitute for the second display on the dot matrix display portion 211.

Figure 13:
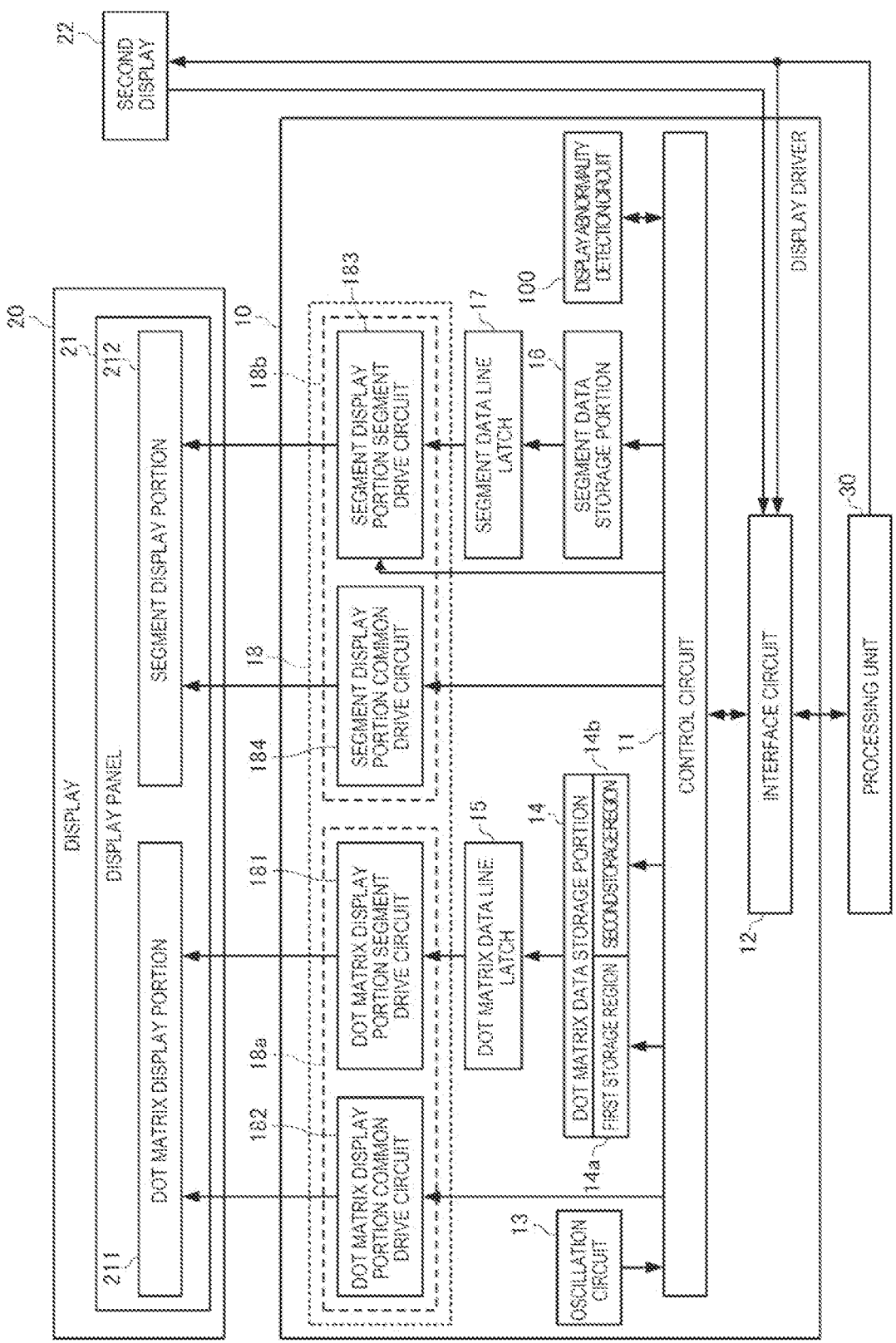
FIG. 13 is a diagram showing an example of another configuration of the display driver of the modification example.

FIG. 13 is a diagram showing an example of a configuration of a display driver of a fourth modification example. In FIG. 13, the same components as those in FIG. 1 are designated by the same reference numerals. As shown in FIG. 13, the display driver 10 of the fourth modification example includes a display 20, a second display 22, a display driver 10, and a processing unit 30.

The processing unit 30 controls the second display 22. Specifically, the processing unit 30 outputs a control signal for turning on or off the second display 22 to the electrodes of the second display 22. For example, the second display 22 is an LED in a shape of a warning light like the display object X1 shown in FIG. 2, and when a warning display is required, the processing unit 30 outputs the control signal for turning on the second display 22 and turns on the second display 22.

The display driver 10 includes a display abnormality detection circuit 100 instead of the display abnormality detection circuit 19 with respect to the embodiment described above. In the display driver 10, a control signal, which is input from the processing unit 30 to the electrodes of the second display 22, and a signal, which is returned from the electrodes of the second display 22, are input to the control circuit 11, respectively, from two external terminals (not shown) of the display driver 10 via the interface circuit 12. The control circuit 11 outputs these two input signals to the display abnormality detection circuit 100. The display abnormality detection circuit 100 detects the display abnormality of the second display 22 based on the two signals supplied from the control circuit 11. The display abnormality of the second display 22 is, for example, an abnormality in which the second display 22 is always turned on, an abnormality in which the second display 22 is always turned off, or the like. Specifically, the display abnormality detection circuit 100 detects the display abnormality of the second display 22 based on the control signal supplied from the control circuit 11 when the signal, which is returned from the electrode of the second display 22, is not the expected voltage value.

In the present modification example, when the power of the display driver 10 is turned on, the processing unit 30 transmits data of the information to be initially displayed on the dot matrix display portion 211 to the display driver 10, and in the display driver 10, the control circuit 11 writes the data in the first storage region 14a of the dot matrix data storage portion 14. Further, the processing unit 30 transmits the data for third icon display, which is data for displaying the third icon that is a substitute for the second display 22, on the dot matrix display portion 211, to the display driver 10, and in the display driver 10, the control circuit 11 writes the data for third icon display in the second storage region 14b of the dot matrix data storage portion 14.

After that, the initial information is displayed on the dot matrix display portion 211. At this point, the second storage region 14b of the dot matrix data storage portion 14 stores the data for third icon display.

In a case in which the control circuit 11 detects the display abnormality of the second display 22, when the second display 22 should be turned on, the control circuit 11 transfers the data for third icon display, from the second storage region 14b of the dot matrix data storage portion 14 to the dot matrix display portion drive circuit 18a. In the present modification example, the control circuit 11 detects the display abnormality of the second display 22 by the display abnormality detection circuit 100 detecting the display abnormality of the second display 22. The dot matrix display portion segment drive circuit 181 outputs a segment drive signal corresponding to the data for third icon display to the dot matrix display portion 211. As a result, a third icon, which is the substitute for the second display 22, is displayed on the dot matrix display portion 211.

Further, when the control circuit 11 detects the display abnormality of the second display 22, the control circuit 11 transmits a signal indicating the display abnormality of the second display 22 to the outside of the display driver 10. Specifically, when the control circuit 11 detects the display abnormality of the second display 22, the control circuit 11 sets a flag indicating that the display abnormality of the second display 22 is detected, in a register (not shown). Further, the control circuit 11 may transmit a signal indicating the display abnormality to the processing unit 30 via the interface circuit 12. By periodically or receiving the signal indicating the display abnormality, and reading the flag, the processing unit 30 can recognize that the display abnormality of the second display 22 is detected. For example, when the control circuit 11 detects the display abnormality of the second display 22, the control circuit 11 transmits a signal indicating the display abnormality of the second display 22 to the outside of the display driver 10. When the control circuit 11 detects the display abnormality of the second display 22, the control circuit 11 may spontaneously transmit the signal indicating the display abnormality of the second display 22 to the outside of the display driver 10 or transmit the signal such as a flag indicating the display abnormality of the second display 22 to the outside of the display driver 10 in response to a request from the outside of the display driver 10. The processing unit 30 receives the signal indicating the display abnormality of the second display 22 and outputs the control signal for turning off the second display 22. As a result, the second display 22 is not turned on. Further, by receiving the signal indicating the display abnormality of the second display 22, the processing unit 30 can display the information different from the third icon, for example, the information related to the response that a user should take to the display of the third icon on the dot matrix display portion 211.

Since other configurations and functions of the display driver 10 of the fourth modification example are the same as those of the above embodiment, the description thereof will be omitted.

In the example of the configuration of the display driver 10 shown in FIG. 13, immediately after the power of the display driver 10 is turned on, the data for third icon display, which is transmitted from the processing unit 30 is written to the second storage region 14b of the dot matrix data storage portion 14 but the data for third icon display may be written in the second storage region 14b of the dot matrix data storage portion 14 by using any other method. For example, as shown in FIGS. 5 and 6, immediately after the power of the display driver 10 is turned on, the control circuit 11 may read the data for third icon display from the ROM provided outside or inside the display driver 10 and write the data in the second storage region 14b of the dot matrix data storage portion 14.

2. Electronic Apparatus

The electronic apparatus of the present embodiment includes a display driver 10 and display 20 of any of the above embodiments or modification examples. As the electronic apparatus of the present embodiment, various electronic apparatuses mounted on the display driver 10 and display 20, for example, an in-vehicle device, an electronic computer, a display, an information processing device, a portable information terminal, a portable game terminal, or the like can be assumed. The in-vehicle device is, for example, an in-vehicle display device such as a cluster panel. The cluster panel is a panel provided in front of a driver's seat and on which meters and the like are displayed.

Figure 14:
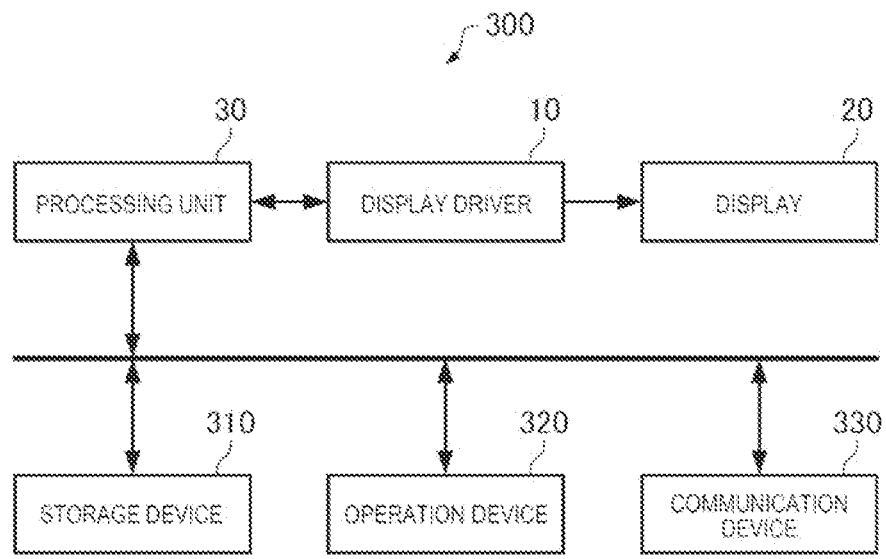
FIG. 14 is a diagram showing an example of a configuration of an electronic apparatus of the present embodiment.

FIG. 14 is a diagram showing an example of a configuration of the electronic apparatus of the present embodiment. As shown in FIG. 7, the electronic apparatus 300 of the present embodiment includes the display driver 10, the display 20, the processing unit 30, the storage device 310, the operation device 320, and the communication device 330. The configurations and functions of the display driver 10, the display 20, and the processing unit 30 are as described above.

The operation device 320 is a user interface that receives various operations from a user. For example, it is configured with a button, a mouse, a keyboard, a touch panel, or the like.

The communication device 330 is a data interface for communicating display data, control data, or the like. The communication device 330 is, for example, a wired communication interface such as USB or a wireless communication interface such as a wireless LAN.

The storage device 310 stores the display data input from the communication device 330. Alternatively, the storage device 310 functions as a working memory of the processing unit 30. The storage device 310 is, for example, a semiconductor memory, a hard disk drive, an optical drive, or the like.

The processing unit 30 performs control processing or various data processing of each portion of the electronic apparatus 300. In particular, the processing unit 30 transmits the display data received by the communication device 330 or the display data stored in the storage device 310 to the display driver 10. The display driver 10 receives the display data, performs various processes described above, and displays information or display objects corresponding to the display data on the display 20.

According to the electronic apparatus 300 of the present embodiment, even when the display abnormality occurs in the first icon, the display driver 10 capable of continuing to display appropriate information by displaying or not displaying the second icon is included, thereby high reliability can be achieved.

3. Moving Object

The moving object of the present embodiment includes a display driver 10 and display 20 of any of the above embodiments or modification examples. The moving object is, for example, an apparatus or a device provided with a drive mechanism such as an engine or a motor, a steering mechanism such as a steering wheel or a rudder, and various electronic apparatuses, and moves on the ground, in the air, or on the sea. As the moving object of the present embodiment, various moving objects mounted on the display driver 10 and display 20, for example, a vehicle, an airplane, a motorcycle, a ship, a traveling robot, a walking robot, or the like can be assumed.

Figure 15:
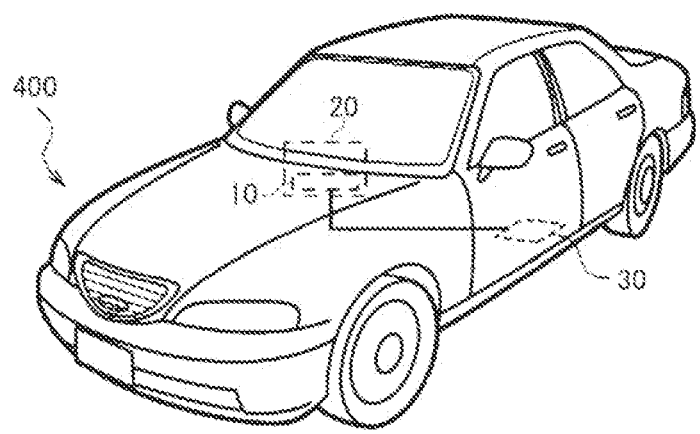
FIG. 15 is a diagram schematically showing a vehicle as a specific example of a moving object of the present embodiment.

FIG. 15 is a diagram schematically showing a vehicle as a specific example of the moving object 400 of the present embodiment. The moving object 400 includes the display driver 10, the display 20, and the processing unit 30. The configurations and functions of the display driver 10, the display 20, and the processing unit 30 are as described above.

The processing unit 30 controls each portion of the moving object 400. In particular, the processing unit 30 transmits display data of information such as a vehicle speed, an amount of remaining fuel, a mileage, and settings of various devices to the display driver 10. The display driver 10 receives the display data, performs various processes described above, and displays information or display objects corresponding to the display data on the display 20.

According to the moving object 400 of the present embodiment, even when the display abnormality occurs in the first icon, the display driver 10 capable of continuing to display appropriate information by displaying or not displaying the second icon is included, thereby high reliability can be achieved.

The present disclosure is not limited to the present embodiment, and various modifications can be carried out within the scope of the gist of the present disclosure.

The above-described embodiments and modification examples are just examples, and the present disclosure is not limited thereto. For example, each embodiment and each modification example may also be appropriately combined with each other.

The present disclosure includes substantially the same configurations, for example, configurations having the same functions, methods, and results, or configurations having the same objects and effects, as the configurations described in the embodiments. In addition, the present disclosure includes a configuration obtained by replacing non-essential portions in the configurations described in the embodiments. Further, the present disclosure includes a configuration that exhibits the same operational effects as those of the configurations described in the embodiments or a configuration capable of achieving the same objects. The present disclosure includes a configuration obtained by adding the configurations described in the embodiments to known techniques.

The following contents are derived from the above-described embodiments and modification examples.

One aspect of a display driver is a display driver for driving a display having a segment display portion and a dot matrix display portion, the display driver including a segment display portion drive circuit outputting a drive signal for segment display to the segment display portion, a dot matrix display portion drive circuit outputting a drive signal for dot matrix display to the dot matrix display portion, a segment data storage portion in which data of a display object including a first icon to be displayed on the segment display portion, is written, a dot matrix data storage portion in which display information data to be displayed on the dot matrix display portion is written, and a control circuit controlling the segment display portion drive circuit and the dot matrix display portion drive circuit, in which the dot matrix data storage portion stores data for second icon display, which is data for displaying a second icon that is a substitute for the first icon on the dot matrix display portion, and when the control circuit detects a display abnormality of the first icon, the control circuit transfers the data for second icon display from the dot matrix data storage portion to the dot matrix display portion drive circuit.

In the display driver, when the display abnormality of the first icon that can be displayed on the segment display portion is detected, instead of displaying the first icon on the segment display portion, the second icon that is the substitute for the first icon is displayed on the dot matrix display portion. Therefore, according to the display driver, even when the display abnormality occurs in the first icon, it is possible to continue displaying the appropriate information by displaying or not displaying the second icon.

Further, according to the display driver, when the display abnormality of the first icon is detected, since the external device of the display driver does not need to transmit the data for second icon display to the control circuit, the second icon can be displayed on the dot matrix display portion independently, and the time until the second icon is displayed on the dot matrix display portion can be shortened.

In one aspect of the display driver, in a case in which the control circuit detects the display abnormality of the first icon, when data for first icon display, which is data for displaying the first icon on the segment display portion, is written in the segment data storage portion, the control circuit may transfer the data for second icon display from the dot matrix data storage portion to the dot matrix display portion drive circuit.

In one aspect of the display driver, a display abnormality detection circuit detecting the display abnormality of the first icon may further be included, in which the control circuit may detect the display abnormality of the first icon by detecting the display abnormality of the first icon by the display abnormality detection circuit.

According to the display driver, the control circuit does not receive the signal indicating the display abnormality of the first icon from the external device of the display driver and can display the second icon on the dot matrix display portion.

In one aspect of the display driver, the segment display portion may be provided with a segment electrode and a common electrode for displaying the first icon, the drive signal for segment display may include a segment drive signal supplied to the segment electrode and a common drive signal supplied to the common electrode, and the display abnormality detection circuit may include a segment abnormality detection circuit that detects an abnormality in the segment drive signal, and a common abnormality detection circuit that detects an abnormality in the common drive signal.

In one aspect of the display driver, the display abnormality detection circuit may detect only the display abnormality of the first icon.

According to the display driver, the display abnormality detection circuit does not need to detect the display abnormality of a plurality of icons so that the number of wirings and circuit elements of the display abnormality detection circuit is reduced, thereby the size of the display abnormality detection circuit can be reduced.

In one aspect of the display driver, the dot matrix data storage portion may include a first storage region in which the display information data is written, and a second storage region in which the data for second icon display is stored.

According to the display driver, in the dot matrix data storage portion since the region where the data for second icon display is stored is separated from the region where the display information data is written, the possibility that the data for second icon display is overwritten and lost is reduced.

In one aspect of the display driver, when the control circuit detects the display abnormality of the first icon, the control circuit may control the segment display portion drive circuit such that the first icon is not displayed on the segment display portion.

According to the display driver, it is possible to prevent the first icon from being erroneously displayed by the display abnormality of the first icon in a situation where the first icon should not be displayed.

In one aspect of the display driver, when the control circuit detects the display abnormality of the first icon, the control circuit may transmit a signal indicating the display abnormality of the first icon to an outside of the display driver.

According to the display driver, by receiving the signal indicating the display abnormality of the first icon, the external device of the display driver can display the information different from the second icon, for example, the information related to the response that a user should take to the display of the second icon, or the like on the dot matrix display portion.

In one aspect of the display driver, at least one of a shape and a display color of the second icon may be different from that of the first icon.

According to the display driver, in the dot matrix display portion, the visibility of the second icon can be improved by setting the second icon to an appropriate color or shape with respect to the background of the display portion.

In one aspect of the display driver, the first icon may be an icon for warning display.

According to the display driver, the possibility that a serious situation occurs because the warning light is erroneously displayed or not displayed on the segment display portion, is reduced.

One aspect of an electronic apparatus includes the one aspect of the display driver and the display.

According to the electronic apparatus, even when the display abnormality occurs in the first icon, the display driver capable of continuing to display appropriate information by displaying or not displaying the second icon is included, thereby high reliability can be achieved.

One aspect of a moving object includes the one aspect of the display driver and the display.

According to the moving object, even when the display abnormality occurs in the first icon, the display driver capable of continuing to display appropriate information by displaying or not displaying the second icon is included, thereby high reliability can be achieved.

What is claimed is:

1. A display driver for driving a display having a segment display portion and a dot matrix display portion, the display driver comprising:
   a segment display portion drive circuit outputting a drive signal for segment display to the segment display portion;
   a dot matrix display portion drive circuit outputting a drive signal for dot matrix display to the dot matrix display portion;
   a segment data storage portion in which data of a display object including a first icon to be displayed on the segment display portion, is written;
   a dot matrix data storage portion in which display information data to be displayed on the dot matrix display portion is written; and
   a control circuit controlling the segment display portion drive circuit and the dot matrix display portion drive circuit, wherein
   the dot matrix data storage portion stores data for second icon display, which is data for displaying a second icon that is a substitute for the first icon on the dot matrix display portion, and
   when the control circuit detects a display abnormality of the first icon, the control circuit transfers the data for second icon display from the dot matrix data storage portion to the dot matrix display portion drive circuit.

2. The display driver according to claim 1, wherein
   in a case in which the control circuit detects the display abnormality of the first icon, when data for first icon display, which is data for displaying the first icon on the segment display portion, is written in the segment data storage portion, the control circuit transfers the data for second icon display from the dot matrix data storage portion to the dot matrix display portion drive circuit.

3. The display driver according to claim 1, further comprising:
   a display abnormality detection circuit detecting the display abnormality of the first icon, wherein
   the control circuit detects the display abnormality of the first icon by detecting the display abnormality of the first icon by the display abnormality detection circuit.

4. The display driver according to claim 3, wherein
   the segment display portion is provided with a segment electrode and a common electrode for displaying the first icon,
   the drive signal for segment display includes a segment drive signal supplied to the segment electrode and a common drive signal supplied to the common electrode, and
   the display abnormality detection circuit includes
     a segment abnormality detection circuit that detects an abnormality in the segment drive signal, and
     a common abnormality detection circuit that detects an abnormality in the common drive signal.

5. The display driver according to claim 3, wherein
   the display abnormality detection circuit detects only the display abnormality of the first icon.

6. The display driver according to claim 1, wherein
the dot matrix data storage portion includes
   a first storage region in which the display information data is written, and
   a second storage region in which the data for second icon display is stored.

7. The display driver according to claim 1, wherein
when the control circuit detects the display abnormality of the first icon, the control circuit controls the segment display portion drive circuit such that the first icon is not displayed on the segment display portion.

8. The display driver according to claim 1, wherein
when the control circuit detects the display abnormality of the first icon, the control circuit transmits a signal indicating the display abnormality of the first icon to an outside of the display driver.

9. The display driver according to claim 1, wherein
at least one of a shape and a display color of the second icon is different from that of the first icon.

10. The display driver according to claim 1, wherein
the first icon is an icon for warning display.

11. An electronic apparatus comprising:
the display driver according to claim 1; and
the display.

12. A moving object comprising:
the display driver according to claim 1; and
the display.

* * * * *